US009149718B2

(12) United States Patent
Takahashi et al.

(10) Patent No.: US 9,149,718 B2
(45) Date of Patent: Oct. 6, 2015

(54) STORAGE MEDIUM HAVING GAME PROGRAM STORED THEREON AND GAME APPARATUS

(75) Inventors: Ryutaro Takahashi, Kyoto (JP); Takafumi Masaoka, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 1718 days.

(21) Appl. No.: 11/604,852

(22) Filed: Nov. 28, 2006

(65) Prior Publication Data

US 2008/0062198 A1 Mar. 13, 2008

(30) Foreign Application Priority Data

Sep. 8, 2006 (JP) ................................. 2006-244475

(51) Int. Cl.
*G09G 5/00* (2006.01)
*A63F 13/40* (2014.01)
*G06T 11/00* (2006.01)
*G06T 19/00* (2011.01)
*G06T 17/00* (2006.01)
*G06T 11/60* (2006.01)
*G06F 9/44* (2006.01)
*G06T 11/20* (2006.01)

(52) U.S. Cl.
CPC ......... *A63F 13/10* (2013.01); *A63F 2300/5553* (2013.01); *A63F 2300/6018* (2013.01); *G06F 9/4443* (2013.01); *G06T 11/00* (2013.01); *G06T 11/206* (2013.01); *G06T 11/60* (2013.01); *G06T 17/00* (2013.01); *G06T 19/00* (2013.01)

(58) Field of Classification Search
CPC ......... G06T 11/60; G06T 19/00; G06T 11/00; G06T 11/206; G06T 17/00; G06F 9/4443; G06F 3/0481

USPC ................ 345/619–630; 273/317.1–353; 463/2–29

See application file for complete search history.

(56) References Cited

U.S. PATENT DOCUMENTS 5,111,409 A * 5/1992 Gasper et al. ................. 715/203
5,375,195 A * 12/1994 Johnston ....................... 345/630
5,491,777 A * 2/1996 Mase et al. .................... 463/31

(Continued)

FOREIGN PATENT DOCUMENTS

| JP | 03-129572 | 6/1991 |
| WO | 2004/023336 | 3/2004 |
| WO | 2004/102357 | 11/2004 |

OTHER PUBLICATIONS

Office Action dated Aug. 5, 2010 in continuation U.S. Appl. No. 12/717,679.

(Continued)

*Primary Examiner* — Abderrahim Merouan
(74) *Attorney, Agent, or Firm* — Nixon & Vanderhye, P.C.

(57) ABSTRACT

A reference character is generated by combining part objects prepared for each site. At least one candidate character object is generated by changing at least one part object among the part objects used in the reference character object. The reference character object and the candidate character object are displayed by a display device, and an input for selection from a user is accepted. Next, a site for which different part objects are used between the selected character object and the reference character object is determined. A new character object is generated by changing the part object used for the determined site with priority. The selected character object is displayed as the reference character, and the newly generated character is displayed as the candidate character.

22 Claims, 19 Drawing Sheets

(56) References Cited

U.S. PATENT DOCUMENTS

| | | | |
|---|---|---|---|
| 5,537,662 A * | 7/1996 | Sato et al. ................... 715/860 |
| 5,563,992 A * | 10/1996 | Murata et al. ................ 345/630 |
| 5,568,599 A * | 10/1996 | Yoshino et al. .............. 345/630 |
| 5,601,487 A * | 2/1997 | Oshima et al. .................... 463/4 |
| 5,644,690 A * | 7/1997 | Yoshino et al. .............. 345/634 |
| 5,649,086 A * | 7/1997 | Belfer et al. ................. 345/441 |
| 5,787,419 A * | 7/1998 | Sato et al. ........................ 707/4 |
| 5,808,624 A | 9/1998 | Ikedo |
| 5,818,457 A * | 10/1998 | Murata et al. ................ 345/629 |
| 5,966,137 A | 10/1999 | Murata |
| 5,995,119 A * | 11/1999 | Cosatto et al. ............... 345/473 |
| 6,215,506 B1 * | 4/2001 | Makino et al. ............... 345/501 |
| 6,226,013 B1 | 5/2001 | Murata et al. |
| 6,234,900 B1 * | 5/2001 | Cumbers ......................... 463/29 |
| 6,348,923 B2 * | 2/2002 | Murata ......................... 345/629 |
| 6,433,783 B2 * | 8/2002 | Murata ......................... 345/440 |
| 6,453,052 B1 * | 9/2002 | Kurokawa et al. ........... 382/100 |
| 6,525,725 B1 * | 2/2003 | Deering ........................ 345/419 |
| 6,661,906 B1 | 12/2003 | Kawade et al. |
| 6,668,101 B2 | 12/2003 | Kaneda |
| 6,738,065 B1 * | 5/2004 | Even-Zohar ................. 345/473 |
| 6,814,662 B2 * | 11/2004 | Sasaki et al. ..................... 463/1 |
| 6,842,172 B2 * | 1/2005 | Kobayashi .................... 345/419 |
| 6,845,171 B2 * | 1/2005 | Shum et al. .................. 382/100 |
| 6,879,323 B1 * | 4/2005 | Nagai et al. .................. 345/420 |
| 6,934,406 B1 * | 8/2005 | Nakano ......................... 382/118 |
| 7,037,196 B2 * | 5/2006 | Kobayashi et al. ............. 463/29 |
| 7,039,216 B2 * | 5/2006 | Shum et al. .................. 382/100 |
| 7,055,103 B2 | 5/2006 | Lif |
| 7,146,061 B2 * | 12/2006 | Cote ............................. 382/284 |
| 7,289,647 B2 * | 10/2007 | Cote ............................. 382/118 |
| 7,634,103 B2 * | 12/2009 | Rubinstenn et al. .......... 382/100 |
| 765,322 A1 | 1/2010 | Nishimori et al. |
| 7,653,220 B2 | 1/2010 | Nishimori et al. |
| 7,809,172 B2 | 10/2010 | Lubow |
| 7,894,674 B2 | 2/2011 | Nakashima et al. |
| 8,005,303 B2 | 8/2011 | Cote |
| 2003/0043194 A1 * | 3/2003 | Lif ................................ 345/764 |
| 2003/0063102 A1 * | 4/2003 | Rubinstenn et al. .......... 345/619 |
| 2003/0194113 A1 * | 10/2003 | Yamaguchi et al. .......... 382/118 |
| 2004/0119723 A1 * | 6/2004 | Inoue et al. ................... 345/619 |
| 2004/0135788 A1 * | 7/2004 | Davidson et al. ............. 345/530 |
| 2005/0026685 A1 | 2/2005 | Ruark et al. |
| 2005/0162419 A1 * | 7/2005 | Kim et al. ..................... 345/419 |
| 2005/0212821 A1 * | 9/2005 | Xu et al. ....................... 345/647 |
| 2006/0132502 A1 * | 6/2006 | Harvill ......................... 345/619 |
| 2006/0143569 A1 | 6/2006 | Kinsella et al. |
| 2006/0188144 A1 * | 8/2006 | Sasaki et al. .................. 382/154 |
| 2007/0025722 A1 * | 2/2007 | Matsugu et al. .............. 396/263 |
| 2010/0167809 A1 * | 7/2010 | Perlman et al. ................. 463/24 |

OTHER PUBLICATIONS

Office Action dated Mar. 4, 2011 in related copending U.S. Appl. No. 12/717,679.

Sep. 6, 2013 European Search Report for EP 06025566.8, 9 pages.

* cited by examiner

|  | PRO-FILE | HAIR | EYE-BROW | EYE | NOSE | MOU-TH | GLA-SSES |
|---|---|---|---|---|---|---|---|
| TYPE | 6 | 12 | 3 | 9 | 3 | 3 | 3 |
| STAGE | 1~2 | 2~9 | 6~9 | 4~6 | 3~5 | 7~10 | 1~5 |

|  | STA-GE 1 | STA-GE 2 | STA-GE 3 | STA-GE 4 | STA-GE 5 | STA-GE 6 | STA-GE 7 | STA-GE 8 |
|---|---|---|---|---|---|---|---|---|
| TYPE 1 | 24 | 1 | 18 | 13 | 34 |  |  |  |
| TYPE 2 | 21 | 16 | 26 | 5 | 2 |  |  |  |
| TYPE 3 | 32 | 11 | 8 | 12 |  |  |  |  |
| TYPE 4 | 9 | 17 | 31 | 41 | 43 |  |  |  |
| TYPE 5 | 27 | 30 | 6 | 37 | 36 | 22 |  |  |
| TYPE 6 | 15 | 38 | 44 | 39 | 7 | 45 | 42 |  |
| TYPE 7 | 3 | 46 | 19 | 33 | 28 |  |  |  |
| TYPE 8 | 4 | 0 | 35 | 40 | 20 | 29 | 23 | 25 |
| SPECIAL TYPE | 47 | 10 | 14 |  |  |  |  |  |

3353 spans STAGE 1–8 columns; 3352 spans TYPE 1–SPECIAL TYPE rows; 3354 points to the SPECIAL TYPE row.

| | SHAPE | ENLARGE-MENT/RED-UCTION | UP/DOWN MOVEMENT | LEFT/RIGHT MOVEMENT | ROTA-TION | COLOR |
|---|---|---|---|---|---|---|
| PROFILE | ○ | × | × | × | × | ○ |
| HAIR | ○ | × | × | × | × | ○ |
| EYEBROW | ○ | ○ | ○ | ○ | ○ | ○ |
| EYE | ○ | ○ | ○ | ○ | ○ | ○ |
| NOSE | ○ | ○ | ○ | × | × | × |
| MOUTH | ○ | ○ | ○ | × | × | ○ |
| BEARD/MUSTACHE | ○ | ○ | ○ | × | × | ○ |
| GLASSES | ○ | ○ | ○ | × | × | ○ |
| MAKEUP | ○ | × | × | × | × | × |
| WRINKLE | ○ | × | × | × | × | × |

STORAGE MEDIUM HAVING GAME PROGRAM STORED THEREON AND GAME APPARATUS

CROSS REFERENCE TO RELATED APPLICATION

The disclosure of Japanese Patent Application No. 2006-244475, filed on Sep. 8, 2006, is incorporated herein by reference.

TECHNICAL FIELD

The exemplary embodiments disclosed herein relate to a storage medium having a game program stored thereon and a game apparatus for creating a character object appearing in a virtual game space, and more specifically to a storage medium having a game program stored thereon and a game apparatus for creating a character object by combining a plurality of part objects respectively provided for a plurality of sites which form a character object.

Conventionally, electronic personal organizers capable of creating a face object by combining part objects which form a human face have been disclosed (see, for example, Japanese Laid-Open Patent Publication No. 3-129572). In such an electronic personal organizer, a face object is created by combining a plurality of patterns prepared for each of elements forming a face in advance in order to reduce a required storage capacity of a memory, and stores the face object as individual face data in association with business card data or address book data.

However, the above-described technology disclosed in Japanese Laid-Open Patent Publication No. 3-129572 regarding the electronic personal organizer for creating a face object conventionally has the following problems. A user needs to select parts one by one based on his/her perception (the user's sense on which is most similar to his/her own or which best represents his/her feature) in order to create his/her face object. For a user who is not good at drawing or painting, it is difficult to create an object or a face object he/she wishes to create as intended. In addition, since the user needs to select one part object for each element of a face, the procedure is troublesome and time-consuming, which is not highly convenient for the user in terms of operability, handiness and the like.

Therefore, a feature of certain exemplary embodiments is to provide a storage medium having stored thereon a game program for allowing even a user who is not good at drawing or painting to easily create a character object as intended.

The certain exemplary embodiments described herein have the following aspects to attain the object mentioned above. The reference numerals, additional explanations and the like in parentheses in this section of the specification indicate the correspondence with the exemplary embodiments described later for easier understanding of the certain exemplary embodiments described herein and are not limiting in any way.

A first aspect is directed to a storage medium having stored thereon a game program executable by a computer of a game apparatus for creating a character object by combining a plurality of part objects, each of which is for each of a plurality of sites which are used for forming a character object appearing in a virtual game space. The game program causes the computer to execute a reference character generation step (S5, S14), an initial candidate character generation step (S17), a display step (S6, S16, S26), a selection input acceptance step (S3), a change site determination step (S4), a changed character generation step (S25, S26), a reference character update step (S5), and a candidate character update step (S26). In the reference character generation step, a reference character object is generated by combining part objects, each of which is selected for each site among the plurality of part objects stored for the respective site. In the initial candidate character generation step, at least one candidate character object is generated by changing at least one part object among the part objects used in the reference character object. In the display step, a display device is caused to display the reference character object and the candidate character object. In the selection input acceptance step, an input to select one of the reference character object and the candidate character object is accepted. In the change site determination step, a site for which different part objects are used between the selected character object and the reference character object is determined. In the changed character generation step, at least one new character object is generated by changing the part object used for the site determined in the change site determination step with priority among the part objects used in the selected character object. In the reference character update step, the reference character object is updated with the selected character object. In the candidate character update step, the candidate character object is updated with the character object generated in the changed character generation step.

In a second aspect based on the first aspect, in the reference character generation step, the reference character object is generated based on a predetermined combination of the plurality of part objects.

In a third aspect based on the second aspect, the reference character generation step includes a parameter input acceptance step (S11, S12) of accepting an input of a predetermined parameter on a user. In the reference character object generation step, the reference character object is generated based on a combination pattern predetermined in accordance with the parameter.

In a fourth aspect based on the third aspect, the parameter is gender information of the user.

In a fifth aspect based on the first aspect, in the reference character generation step, the reference character object is generated by randomly combining the plurality of part objects.

In a sixth aspect based on the first aspect, the reference character object and the candidate character object are each a face object of the character object.

In a seventh aspect based on the first aspect, in the changed character generation step, the part object is changed by replacing the part object with a different part object.

In an eighth aspect based on the first aspect, in the changed character generation step, the part object is changed by executing a predetermined treatment on the part object.

In a ninth aspect based on the first aspect, in the initial candidate character generation step and in the changed character generation step, the number of part objects to be changed has a predetermined upper limit.

A tenth aspect is directed to a storage medium having stored thereon a game program executable by a computer of a game apparatus for creating a character object by combining a plurality of part objects, each of which is for each of a plurality of sites which are used for forming a character object appearing in a virtual game space. The game program causes the computer to execute a reference character generation step (S5, S14), a candidate character generation step (S17), a display step (S6, S16, S26), a selection input acceptance step (S3), a changed character generation step (S7), a reference character update step (S5), and a candidate character update step (S7). A plurality of part objects for each site are divided into groups, and the part objects of each group are stored in a memory (33) and arranged as gradually and sequentially changing. In the reference character generation step, a reference character object is generated by reading a part object from one of the groups for each site. In the candidate character generation step, at least one candidate character object is generated by reading a part object which is stored close to at least one part object among the part objects used in the reference character object. In the display step, a display device is caused to display the reference character object and the candidate character object. In the selection input acceptance step, an input to select one of the reference character object and the candidate character object is accepted. In the changed character generation step, at least one new character object is generated by reading a part object which is stored close to at least one part object among the part objects used in the selected character object. In the reference character update step, the reference character object is updated with the selected character object. In the candidate character update step, the candidate character object is updated with the character object generated in the changed character generation step.

According to an eleventh aspect based on the tenth aspect, in the candidate character generation step, the part object is read from storage positions within a predetermined range centered around the storage position of the at least one part object used in the reference character object.

According to a twelfth aspect based on the tenth aspect, in the changed character generation step, the part object is read from storage positions within a predetermined range centered around the storage position of the at least one part object used in the selected character object.

According to a thirteenth aspect based on the tenth aspect, the part objects are stored as a one-dimensional string for each site.

According to a fourteenth aspect based on the thirteenth aspect, the part objects include a plurality of the one-dimensional string for each site.

According to a fifteenth aspect based on the fourteenth aspect, the candidate character generation step includes a type change step (S35, S36) of selecting a one-dimensional string, which is different from the one-dimensional string including the part object used in the reference character object, at a predetermined probability. In the candidate character object generation step, the candidate character object is generated using the part object included in the selected one-dimensional string.

According to a sixteenth aspect based on the fourteenth aspect, the changed character generation step includes a type change step (S35, S36) of selecting a one-dimensional string, which is different from the one-dimensional string including the part object used in the selected character object, at a predetermined probability. In the changed character generation step, the new candidate character object is generated using the part object included in the selected one-dimensional string.

A seventeenth aspect is directed to a game apparatus (3) for creating a character object by combining a plurality of part objects, each of which is for each of a plurality of sites which are used for forming a character object appearing in a virtual game space. The game apparatus comprises a reference character generation section (30), an initial candidate character generation section (30), a display output section (30, 37), a selection input acceptance section (30), a change site determination section (30), a changed character generation section (30), a reference character update section (30), and a candidate character update section (30). The reference character generation section generates a reference character object by combining part objects, each of which is selected for each site among the plurality of part objects stored for the respective site. The initial candidate character generation section generates at least one candidate character object by changing at least one part object among the part objects used in the reference character object. The display output section causes a display device to display the reference character object and the candidate character object. The selection input acceptance section accepts an input to select one of the reference character object and the candidate character object. The change site determination section determines a site for which different part objects are used between the selected character object and the reference character object. The changed character generation section generates at least one new character object by changing the part object used for the site determined in the change site determination step with priority among the part objects used in the selected character object. The reference character update section updates the reference character object with the selected character object. The candidate character update section updates the candidate character object with the character object generated by the changed character generation section.

An eighteenth aspect is directed to a game apparatus (3) for creating a character object by combining a plurality of part objects, each of which is for each of a plurality of sites which are used for forming a character object appearing in a virtual game space. The game apparatus comprises a reference character generation section (30), a candidate character generation section (30), a display output section (30, 37), a selection input acceptance section (30), a changed character generation section (30), a reference character update section (30), and a candidate character update section (30). A plurality of part objects for each site are divided into groups, and the part objects of each group are stored in a memory (33) and arranged as gradually and sequentially changing. The reference character generation section generates a reference character object by reading a part object from one of the groups for each site. The candidate character generation section generates at least one candidate character object by reading a part object which is stored close to at least one part object among the part objects used in the reference character object. The display output section causes a display device to display the reference character object and the candidate character object. The selection input acceptance section accepts an input to select one of the reference character object and the candidate character object. The changed character generation section generates at least one new character object by reading a part object which is stored close to at least one part object among the part objects used in the selected character object. The reference character update section updates the reference character object with the selected character object. The candidate character update section updates the candidate character object with the character object generated by the changed character generation section.

According to the first aspect, the candidate character object is updated by changing the part object, with priority, of the site for which different part objects are used between the reference character object and the candidate character object. Namely, a candidate character is generated as a result of changing the part object of the site, with priority, which is considered to be the site that the user wishes to change, so that such a newly generated character is presented to the user for selection. In addition, the user only needs to repeat the operation of selecting one object among the objects displayed. As compared to the case in which the user needs to select one part object for each of a plurality of sites to create an object, the load on the user for the object generation procedure is alleviated. Even a user who is not good at drawing or painting can easily generate an object as intended.

According to the second through fourth aspects, the user's gender, for example, is input as a parameter. A reference character object is generated using a combination pattern predetermined in accordance with the parameter. Therefore, a reference character object can be generated which reflects the user's wishes to some extent from the start.

According to the fifth aspect, the reference character object is randomly generated. This offers a wide selection for the reference character to the user.

According to the sixth aspect, an object of a face, which is the most characteristic site of humans, can be generated as intended by a simple operation. This improves the convenience on the side of the user for, for example, generating a character object reflecting the user's own appearance.

According to the seventh aspect, the part object is replaced with a completely different part object. This offers a wide selection for the part objects to the user.

According to the eighth aspect, a treatment is executed on the part object. Therefore, a wide variety of part objects can be presented while the memory capacity required for storing the part objects is reduced.

According to the ninth aspect, the number of sites to be changed is limited. Thus, a character object which is similar to the previously generated character object to an appropriate extent can be generated and displayed. This can generate a character object reflecting the user's wishes in detail, and allows the user to select the part object in the manner of fine-tuning.

According to the tenth aspect, the part objects are stored in a memory and arranged as gradually and sequentially changing. By simply reading a part object stored close to a part object of interest, a candidate character object a similar to the previously generated character object can be generated. Namely, such a similar character object can be generated by merely executing relatively easy file access processing.

According to the eleventh and twelfth aspects, a character object can be generated by reading a part object from storage positions centered around the storage position of the part object used in the current character object. Therefore, a similar character object can be generated by merely executing relatively easy file access processing.

According to the thirteenth through sixteenth aspects, a highly similar character can be generated along a one-dimensional string, and also the one-dimensional string itself can be changed to another string. Thus, a non-similar character can be suddenly generated while generating a highly similar character. This gives an amusing change to the game and makes the game more entertaining.

According to the seventeenth aspect, substantially the same effects as those of the first aspect are provided.

According to the eighteen aspect, substantially the same effects as those of the tenth aspect are provided.

These and other features, aspects and advantages of the certain exemplary embodiments will become more apparent from the following detailed description when taken in conjunction with the accompanying drawings.

BRIEF DESCRIPTION OF THE DRAWINGS

FIG. 23 shows an example of a change particular table 339.

DETAILED DESCRIPTION

Figure 1:
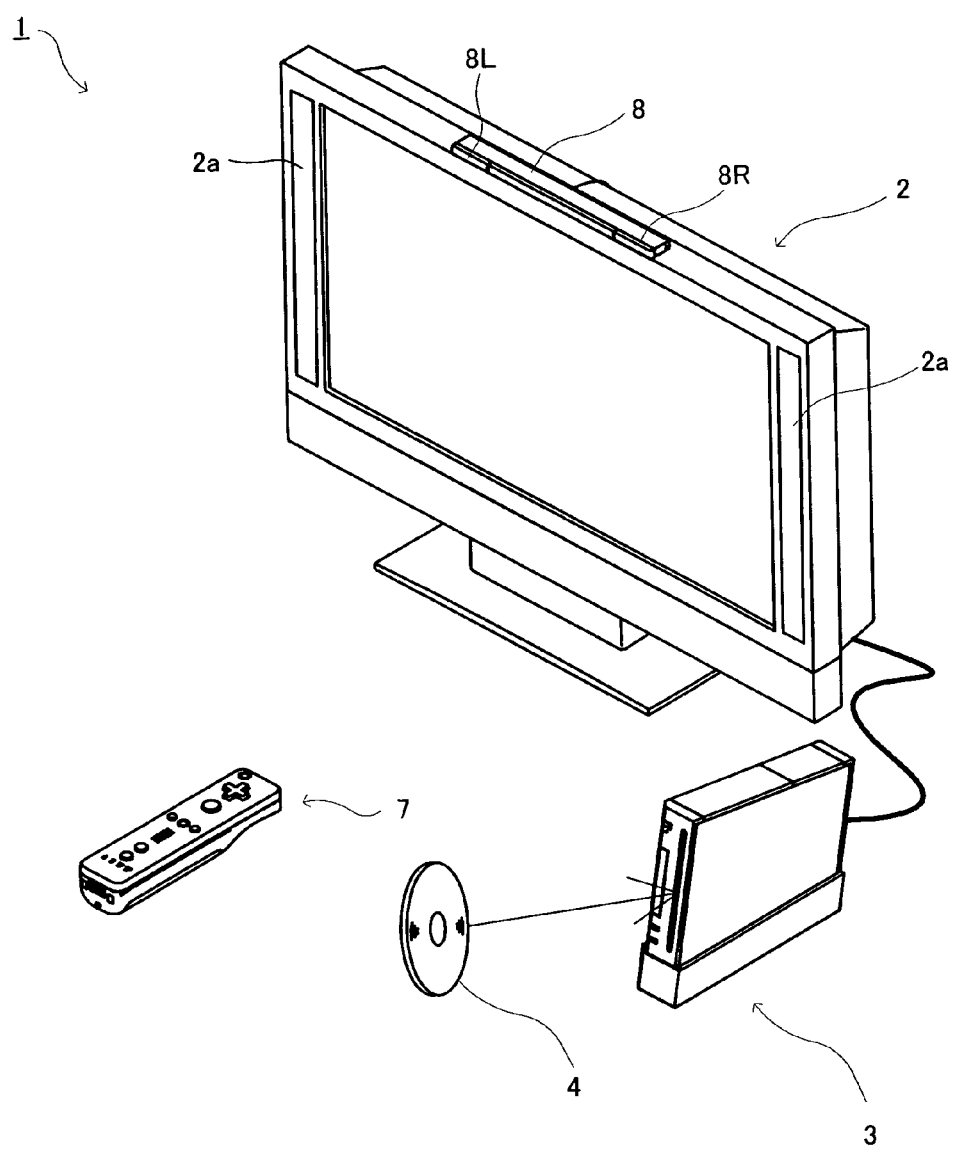
FIG. 1 is an external view of a game system 1 according to an exemplary embodiment.
Figure 2:
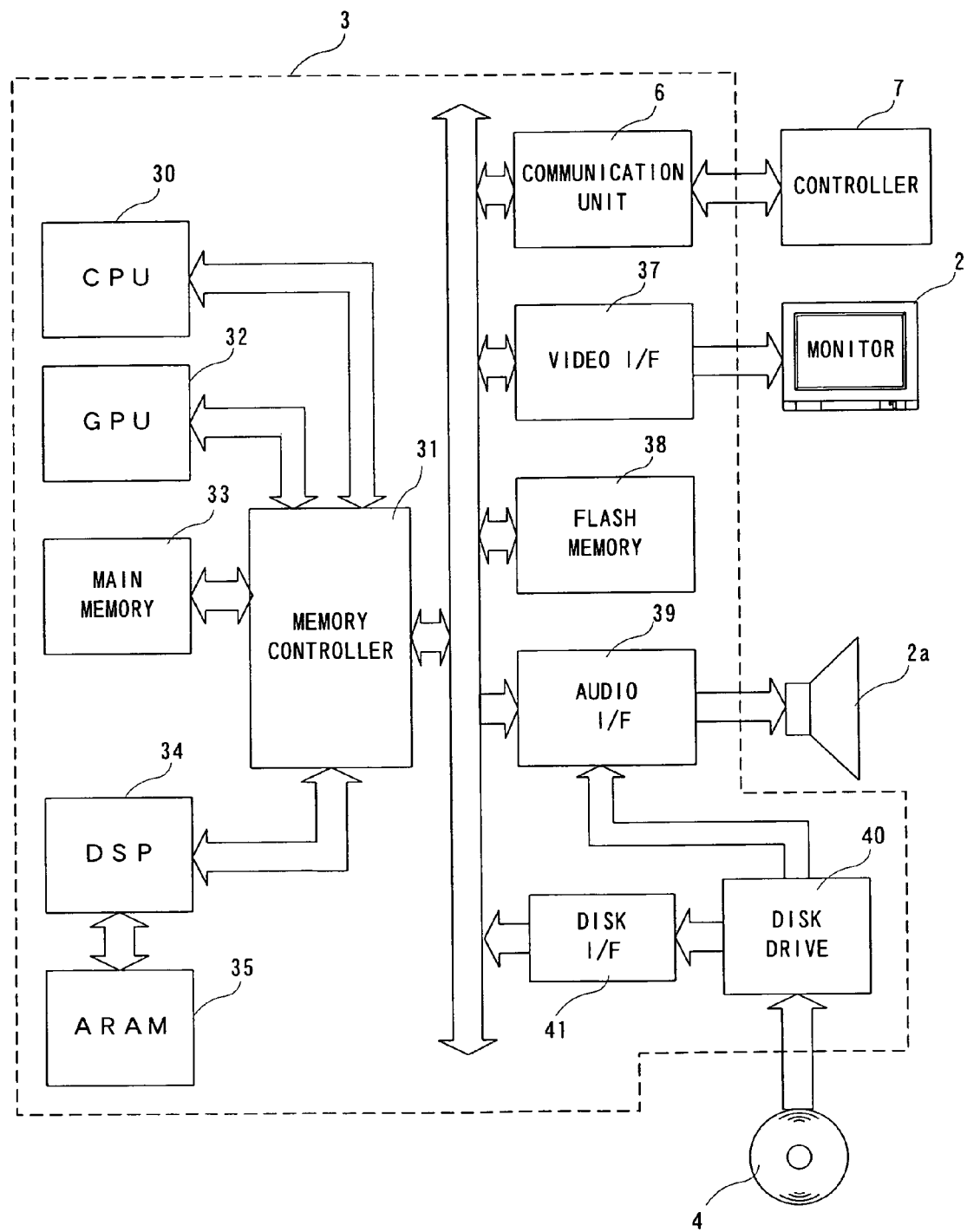
FIG. 2 is a functional block diagram of a game apparatus main body 3 shown in FIG. 1.

Certain exemplary embodiments will be described with reference to the drawings. The following exemplary embodiments are not intended to be limiting in any way. Before providing a detailed description of each of the exemplary, a structure of a game apparatus commonly used in the exemplary embodiments will be described. Hereinafter, in order to give a specific description, a game system 1 including an installation type game apparatus as an exemplary game apparatus will be described. FIG. 1 is an external view of the game system 1 including an installation type game apparatus main body 3. FIG. 2 is a block diagram of the game apparatus main body 3. Hereinafter, the game system 1 will be described.

As shown in FIG. 1, the game system 1 includes a home-use TV receiver (hereinafter, referred to as a "monitor") 2 as an example of display means and the installation type game apparatus main body 3 connected to the monitor 2 via a connection cord. The monitor 2 includes speakers 2a for outputting an audio signal which is output from the game apparatus main body 3. The game system 1 further includes an optical disc 4 having stored thereon a game program as an exemplary information processing program according to the exemplary embodiments described herein. The game apparatus main body 3 has a computer mounted thereon for executing the game program stored on the optical disc 4 and causing the monitor 2 to display a game screen. The game system 1 includes a controller 7 for providing the game apparatus main body 3 with operation information required to play a game, for example, objects of characters and the like displayed in the game screen.

The game apparatus main body 3 has a built-in communication unit 6 (FIG. 2). The communication unit 6 receives data which is wirelessly transmitted from the controller 7, and transmits data from the game apparatus main body 3 to the controller 7. The controller 7 and the game apparatus main body 3 communicate each other wirelessly. On the game apparatus main body 3, the optical disc 4 as an exemplary exchangeable information storage medium is detachably mounted. The game apparatus main body 3 has, on a front main surface thereof, a power ON/OFF switch, a game processing reset switch, an opening for mounting the optical disc 4, an eject switch for removing the optical disc 4 from the opening, and the like.

On the game apparatus main body 3, a flash memory 38 (FIG. 2) is mounted, which acts as a backup memory for fixedly storing saved data or the like. The game apparatus main body 3 executes a game program or the like stored on the optical disc 4 and displays the result on the monitor 2 as a game object. The game apparatus main body 3 can also reproduce a state of a game played in the past using saved data stored on the flash memory 38 and display the game object on the monitor 2. A player playing with the game apparatus main body 3 can enjoy the game by operating the controller 7 while watching the game object displayed on the monitor 2.

The controller 7 wirelessly transmits transmission data such as operation information or the like to the game apparatus main body 3 having the built-in communication unit 6, using the technology of Bluetooth (registered trademark) or the like. The controller 7 is operation means for mainly operating a player object or the like appearing in a game space displayed on a display screen of the monitor 2. The controller 7 includes a housing which is small enough to be held by one hand, and a plurality of operation buttons (including a cross key, a stick and the like) exposed on a surface of the housing. As described later in detail, the controller 7 also includes an imaging information calculation section 74 (FIG. 4) for taking an image of an object viewed from the controller 7. As an example of an imaging target of the imaging information calculation section 74, two LED modules (hereinafter, referred to as "markers") 8L and 8R are provided in the vicinity of the display screen of the monitor 2. The markers 8L and 8R each output infrared light forward from the monitor 2. The controller 7 can generate a sound or vibration in accordance with the transmission data which is wirelessly transmitted from the communication unit 6 of the game apparatus main body 3 and received by a communication section 75 (FIG. 7) in the controller 7.

As shown in FIG. 2, the game apparatus main body 3 includes, for example, a CPU (central processing unit) 30 for executing various types of programs. The CPU 30 executes a start program stored on a boot ROM (not shown) to, for example, initialize memories including a main memory 33, and then executes a game program stored on the optical disc 4 to perform game processing or the like in accordance with the game program. The CPU 30 is connected to a GPU (Graphics Processing Unit) 32, the main memory 33, a DSP (Digital Signal Processor) 34, an ARAM (Audio RAM) 35 and the like via a memory controller 31. The memory controller 31 is connected to the communication unit 6, a video I/F (interface) 37, the flash memory 38, an audio I/F 39, and a disc I/F 41 via a predetermined bus. The video I/F 37, the audio I/F 39 and the disc I/F 41 are respectively connected to the monitor 2, the speaker 2a and a disc drive 40.

The GPU 32 performs object processing based on an instruction from the CPU 30. The GPU 32 includes, for example, a semiconductor chip for performing calculation processing necessary for displaying 3D graphics. The GPU 32 performs the object processing using a memory dedicated for object processing (not shown) or a part of the storage area of the main memory 33. The GPU 32 generates game object data and a movie to be displayed on the monitor 2 using such memories, and outputs the generated data or movie to the monitor 2 via the memory controller 31 and the video I/F 37 as necessary.

The main memory 33 is a storage area used by the CPU 30, and stores a game program or the like necessary for processing performed by the CPU 30 as necessary. For example, the main memory 33 stores a game program, various types of data or the like read from the optical disc 4 by the CPU 30. The game program, the various types of data or the like stored on the main memory 33 are executed by the CPU 30.

The DSP 34 processes sound data or the like generated by the CPU 30 during the execution of the game program. The DSP 34 is connected to the ARAM 35 for storing the sound data or the like. The ARAM 35 is used when the DSP 34 performs predetermined processing (e.g., storage of the game program or sound data already read). The DSP 34 reads the sound data stored on the ARAM 35 and outputs the sound data to the speaker 2a included in the monitor 2 via the memory controller 31 and the audio I/F 39.

The memory controller 31 comprehensively controls data transfer, and is connected to the various I/Fs described above. The communication unit 6 is connected to the game apparatus main body 3 via the bus. As described above, the communication unit 6 receives transmission data from the controller 7 and outputs the transmission data to the CPU 30. The communication unit 6 also transmits transmission data which is output from the CPU 30 to the communication section 75 of the controller 7. The video I/F 37 is connected to the monitor 2. The audio I/F 39 is connected to the speaker 2a built in the monitor 2, such that the sound data read by the DSP 34 from the ARAM 35 or sound data directly output from the disc drive 40 is output through the speaker 2a. The disc I/F 41 is connected to the disc drive 40. The disc drive 40 reads data stored at a predetermined reading position of the optical disc 4 and outputs the data to a bus of the game apparatus main body 3 or the audio I/F 39.

Figure 3:
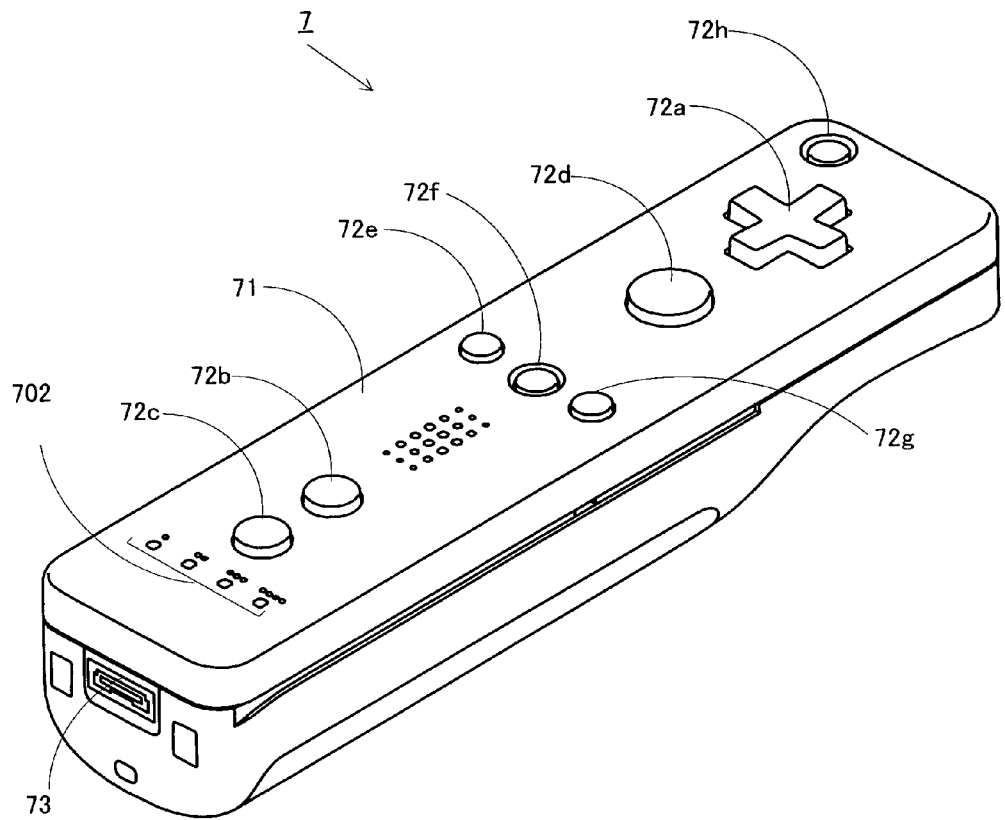
FIG. 3 is an isometric view of a controller 7 shown in FIG. 1 seen from the top rear side thereof.
Figure 3:
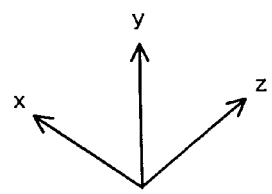
Figure 4:
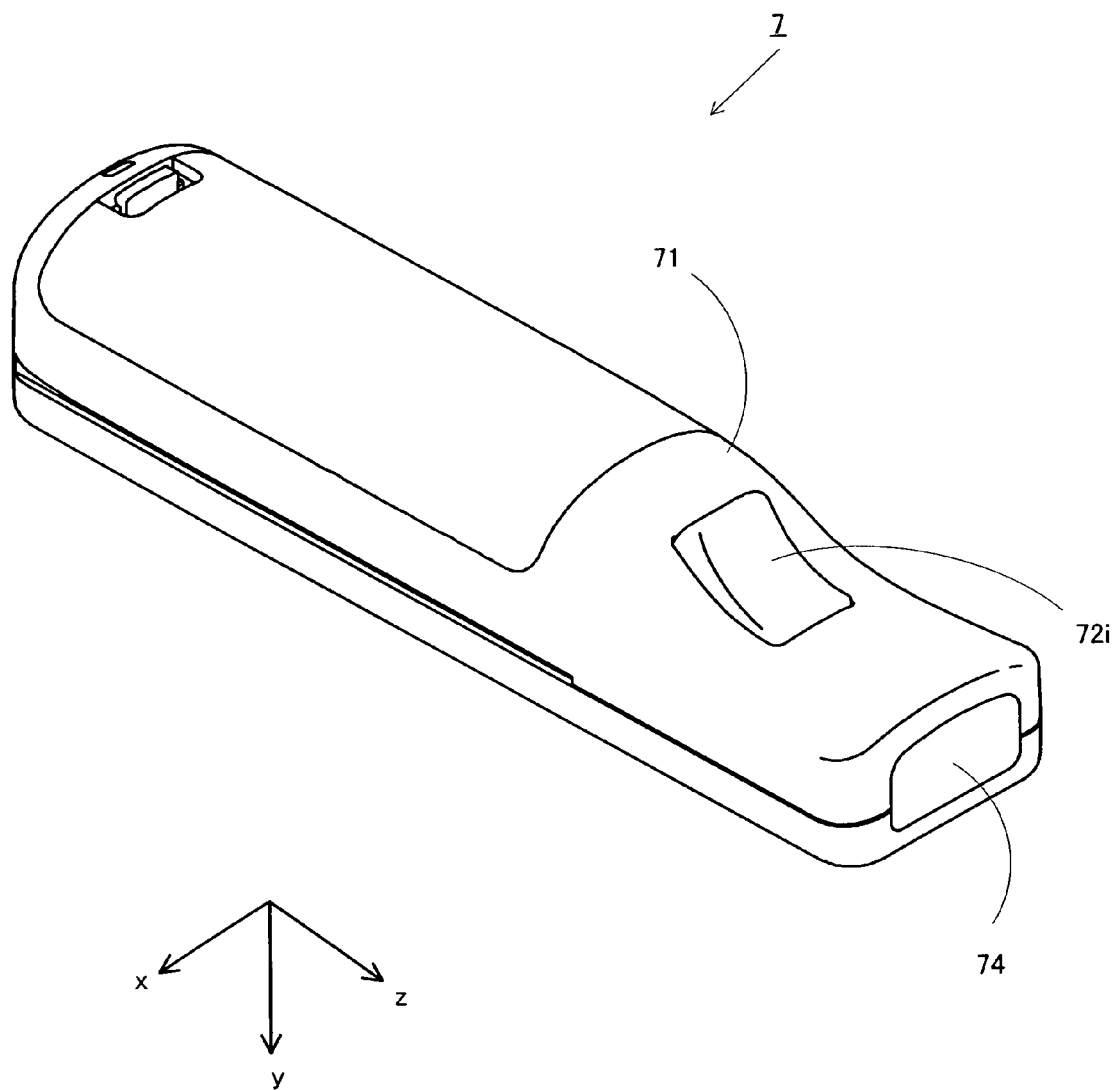
FIG. 4 is an isometric view of the controller 7 shown in FIG. 3 seen from the bottom front side thereof.

With reference to FIG. 3 and FIG. 4, the controller 7 will be described. FIG. 3 is an isometric view of the controller 7 seen from the top rear side thereof. FIG. 4 is an isometric view of the controller 7 seen from the bottom front side thereof.

As shown in FIG. 3 and FIG. 4, the controller 7 includes a housing 71 and an operation section 72 including a plurality of operation buttons provided on surfaces of the housing 71. The housing 71 has a generally parallelepiped shape extending in a longitudinal direction from front to rear. The overall size of the housing 71 is small enough to be held by one hand of an adult or even a child. The housing 71 is formed by plastic molding or the like.

At the center of a front part of a top surface of the housing 71, a cross key 72a is provided. The cross key 72a is a cross-shaped four-direction push switch. The cross key 72a includes projecting operation portions corresponding to the four directions (front, rear, right and left) and arranged at an interval of 90 degrees. The player selects one of the front, rear, right and left directions by pressing one of the operation portions of the cross key 72a. Through an operation on the cross key 72a, the player can, for example, instruct a direction in which a player character or the like appearing in a virtual game world is to move or select one of a plurality of alternatives.

The cross key 72a is an operation section for outputting an operation signal in accordance with the above-described direction input operation performed by the player, but such an operation section may be provided in another form. For example, the operation section may include four push switches provided in a cross arrangement, and output an operation signal in accordance with the push switch which has been pressed. The operation section may further include a center switch provided at the intersection of the cross in addition to the four push switches. Alternatively, the cross key 72a may be replaced with an operation section which includes an inclinable stick (so-called joystick) projecting from the top surface of the housing 71 and outputs an operation signal in accordance with the inclining direction of the stick. Still alternatively, the cross key 72a may be replaced with an operation section which includes a disc-shaped member horizontally slidable and outputs an operation signal in accordance with the sliding direction of the disc-shaped member. Still alternatively, the cross key 72a may be replaced with a touch pad.

Rearward to the cross key 72a on the top surface of the housing 71, a plurality of operation buttons 72b through 72g are provided. The operation buttons 72b through 72g are each an operation section for outputting a respective operation signal when the player presses a head thereof. For example, the operation buttons 72b through 72d are assigned functions of a first button, a second button, and an A button. The operation buttons 72e through 72g are assigned functions of a minus button, a home button and a plus button, for example. The operation buttons 72b through 72g are assigned various functions in accordance with the game program executed by the game apparatus main body 3. In the exemplary arrangement shown in FIG. 3, the operation buttons 72b through 72d are arranged in a line extending in the front-rear direction at the center of the top surface of the housing 71. The operation buttons 72e through 72g are arranged in a line extending in the left-right direction between the operation buttons 72b and 72d. The operation button 72f has a top surface thereof buried in the top surface of the housing 71, so as not to be inadvertently pressed by the player.

Forward to the cross key 72a on the top surface of the housing 71, an operation button 72h is provided. The operation button 72h is a power switch for remote-controlling the power of the game apparatus main body 3 to be on or off. The operation button 72h also has a top surface thereof buried in the top surface of the housing 71, so as not to be inadvertently pressed by the player.

Rearward to the operation button 72c on the top surface of the housing 71, a plurality of LEDs 702 are provided. The controller 7 is assigned a controller type (number) so as to be distinguishable from the other controllers 7. For example, the LEDs 702 are used for informing the player of the controller type which is currently set to the controller 7 that he/she is using. Specifically, when the controller 7 transmits the transmission data to the communication unit 6, one of the plurality of LEDs corresponding to the controller type is lit up.

On the top surface of the housing 71, sound holes for outputting a sound from a speaker (speaker 706 in FIG. 5) described later is provided between the operation button 72b and the operation buttons 72e through 72g.

On a bottom surface of the housing 71, a recessed portion is formed. As described later in more detail, the recessed portion is formed at a position at which an index finger or middle finger of the player is located when the player holds the controller 7 with one hand in the state where a front surface of the controller 7 is directed toward the markers 8L and 8R. On a slope surface of the recessed portion, an operation button 72i is provided. The operation button 72i is an operation section acting as, for example, a B button.

On the front surface of the housing 71, an imaging element 743 (see FIG. 6) included in the imaging information calculation section 74 is provided. The imaging information calculation section 74 is a system for analyzing object data, an image of which is taken by the controller 7, and detecting the position of the center of gravity, the size and the like of an area having a high brightness in the image data. The imaging information calculation section 74 has, for example, a maximum sampling period of about 200 frames/sec., and therefore can trace and analyze even a relatively fast motion of the controller 7. The structure of the imaging information calculation section 74 will be described later in detail. On a rear surface of the housing 71, a connector 73 is provided. The connector 73 is, for example, a edge connector, and is used for engaging and connecting the controller 7 with a connection cable.

In order to give a specific description below, a coordinate system which is set for the controller 7 will be defined. As shown in FIG. 3 and FIG. 4, x, y and z axes perpendicular to one another are defined for the controller 7. Specifically, the longitudinal direction of the housing 71, i.e., the front-rear direction of the controller 7, is set as the z axis. A direction toward the front surface of the controller 7 (the surface having the imaging information calculation section 74) is set as a positive z-axis direction. The up-to-down direction of the controller 7 is set as the y axis. A direction toward the top surface of the controller housing 71 (the surface having the operation button 72i) is set as a positive y-axis direction. The left-right direction of the controller 7 is set as the x axis. A direction toward a left surface of the housing 71 (the surface which is not shown in FIG. 3 but is shown in FIG. 4) is set as a positive x-axis direction.

Figure 5:
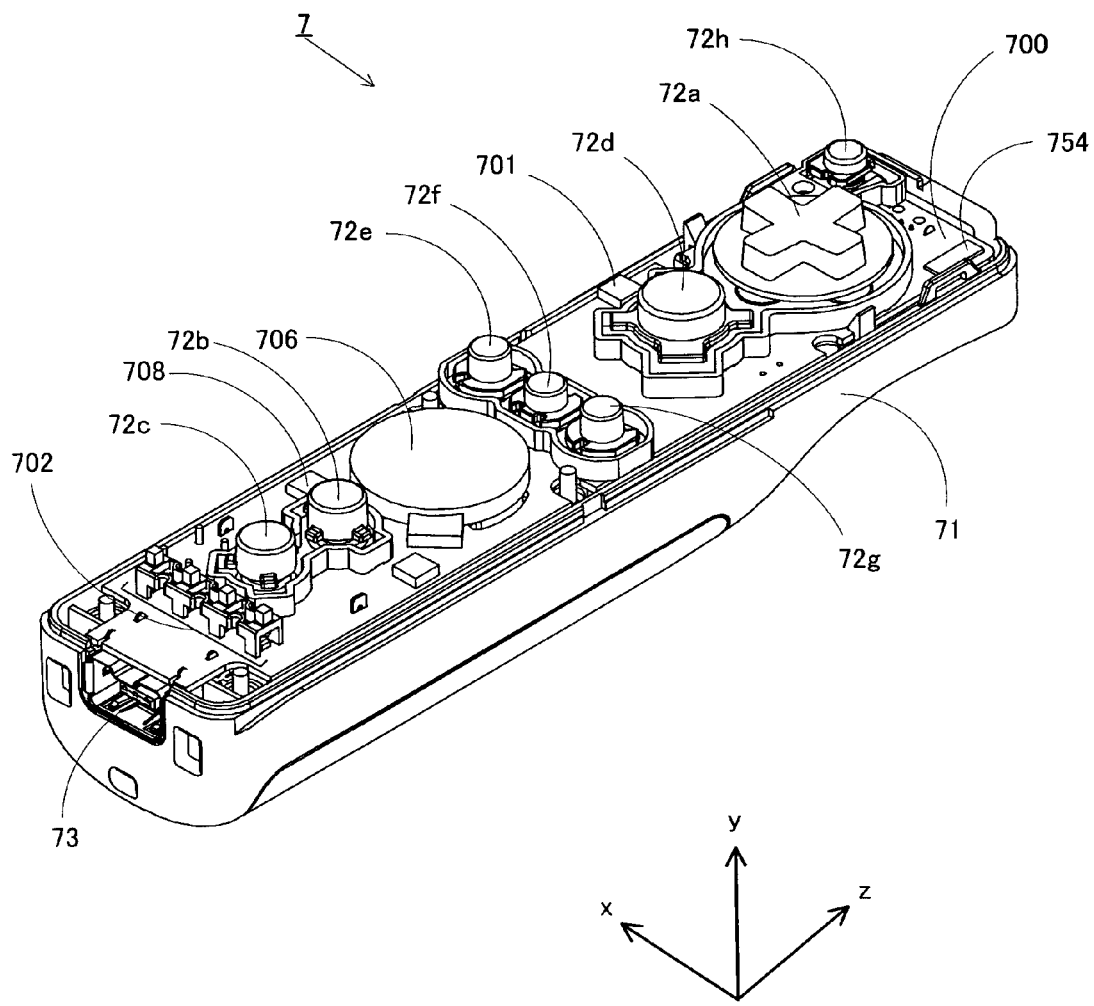
FIG. 5 is an isometric view of the controller 7 shown in FIG. 3 in the state where an upper casing is removed.
Figure 6:
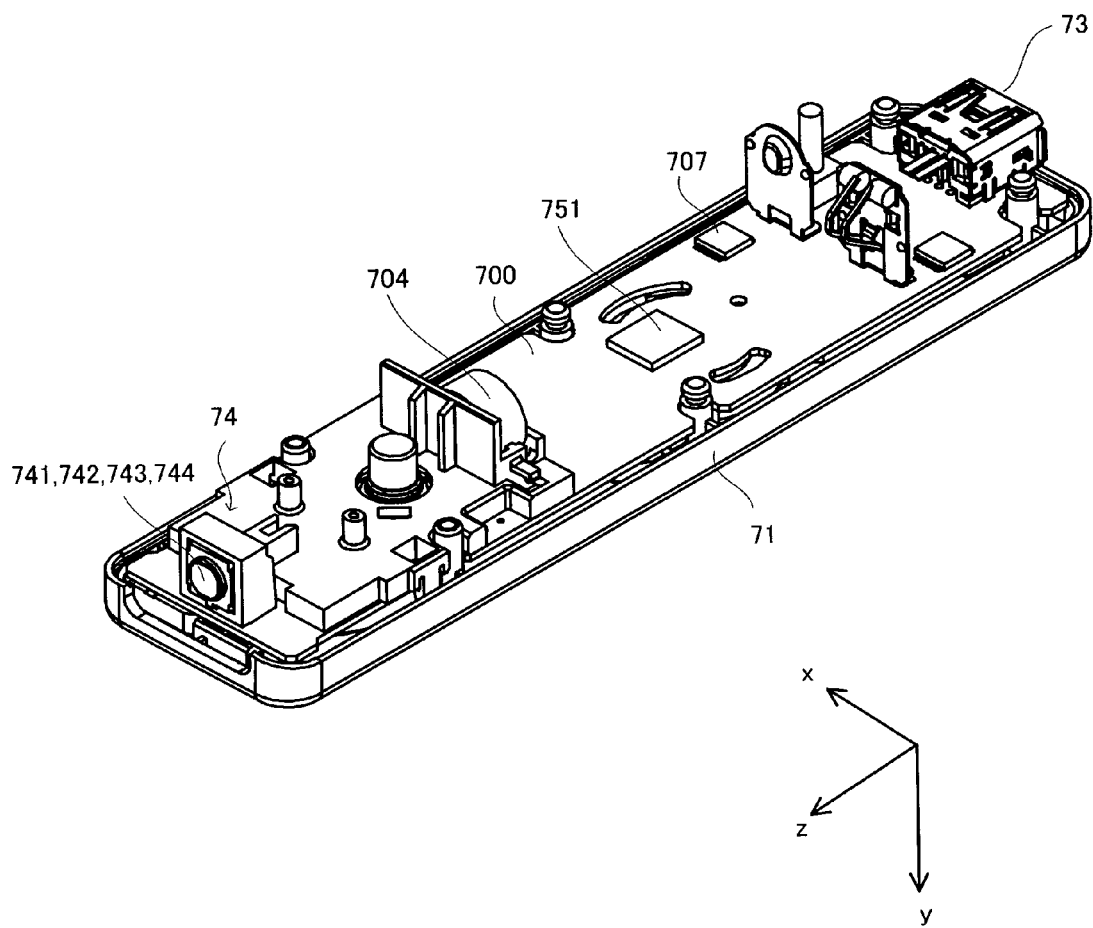
FIG. 6 is an isometric view of the controller 7 shown in FIG. 3 in the state where a lower casing is removed.

With reference to FIG. 5 and FIG. 6, an internal structure of the controller 7 will be described. FIG. 5 is an isometric view of the controller 7 seen from the rear side, illustrating a state where an upper casing (a part of the housing 71) of the controller 7 is removed. FIG. 6 is an isometric view of the controller 7 seen from the front side, illustrating a state where a lower casing (a part of the housing 71) of the controller 7 is removed. FIG. 6 shows a reverse side of a substrate 700 shown in FIG. 5.

As shown in FIG. 5, the substrate 700 is fixed inside the housing 71. On a top main surface of the substrate 700, the operation buttons 72a through 72h, an acceleration sensor 701, the LEDs 702, an antenna 754 and the like are provided. These elements are connected to a microcomputer 751 (see FIG. 6 and FIG. 7) or the like via lines (not shown) formed on the substrate 700 or the like. The microcomputer 751 acts as button data generation means of the certain exemplary embodiments described herein so as to generate operation button data in accordance with the type of the operated button, such as the operation button 72a or the like. This mechanism is known and is realized by, for example, the microcomputer 751 detecting that the line is connected or disconnected by a switch mechanism such as a tact switch provided below the keytop. More specifically, when an operation button is pressed, the line is connected to be conductive. The microcomputer 751 detects the operation button connected to the line which has become conductive, and generates a signal in accordance with the type of the detected operation button.

The controller 7 acts as a wireless controller owing to a wireless module 753 (see FIG. 7) and the antenna 754. The housing 71 accommodates a quartz vibrator for generating a reference clock of the microcomputer 751 described later in detail. On the top main surface of the substrate 700, the speaker 706 and an amplifier 708 are provided. The acceleration sensor 701 is provided on the substrate 700 to the left of the operation button 72d (i.e., in a peripheral area of the substrate 700, not in a central area). Owing to such an arrangement, as the controller 7 rotates around the longitudinal direction thereof, the acceleration sensor 701 detects an acceleration including a centrifugal force component in addition to a component of direction change of gravitational acceleration. As a result, the game apparatus main body 3 or the like can determine the rotation of the controller 7 at a high sensitivity based on the detected acceleration through a predetermined calculation.

As shown in FIG. 6, at a front edge of a bottom main surface of the substrate 700, the image information calculation section 74 is provided. The image information calculation section 74 includes an infrared filter 741, a lens 742, the imaging element 743 and an object processing circuit 744 located in this order from the front surface of the controller 7. These elements are attached to the bottom main surface of the substrate 700. At a rear edge of the bottom main surface of the substrate 700, the connector 73 is attached. On the bottom main surface of the substrate 700, a sound IC 707 and the microcomputer 751 are provided. The sound IC 707 is connected to the microcomputer 751 and the amplifier 708 via lines provided on the substrate 700 or the like, and outputs a sound signal to the speaker 706 via the amplifier 708 in accordance with the sound data transmitted from the game apparatus main body 3.

On the bottom main surface of the substrate 700, a vibrator 704 is attached. The vibrator 704 is, for example, a vibration motor or a solenoid. The vibrator 704 is connected to the microcomputer 751 via lines provided on the substrate 700 or the like, and turns the microcomputer 751 on or off in accordance with vibration data transmitted from the game apparatus main body 3. The controller 7 is vibrated by an actuation of the vibrator 704, and the vibration is conveyed to the player holding the controller 7. Thus, a so-called vibration-responsive game is realized. Since the vibrator 704 is provided slightly forward with respect to the center of the housing 71, the housing 71 held by the player is largely vibrated. Thus, the player easily senses the vibration.

Figure 7:
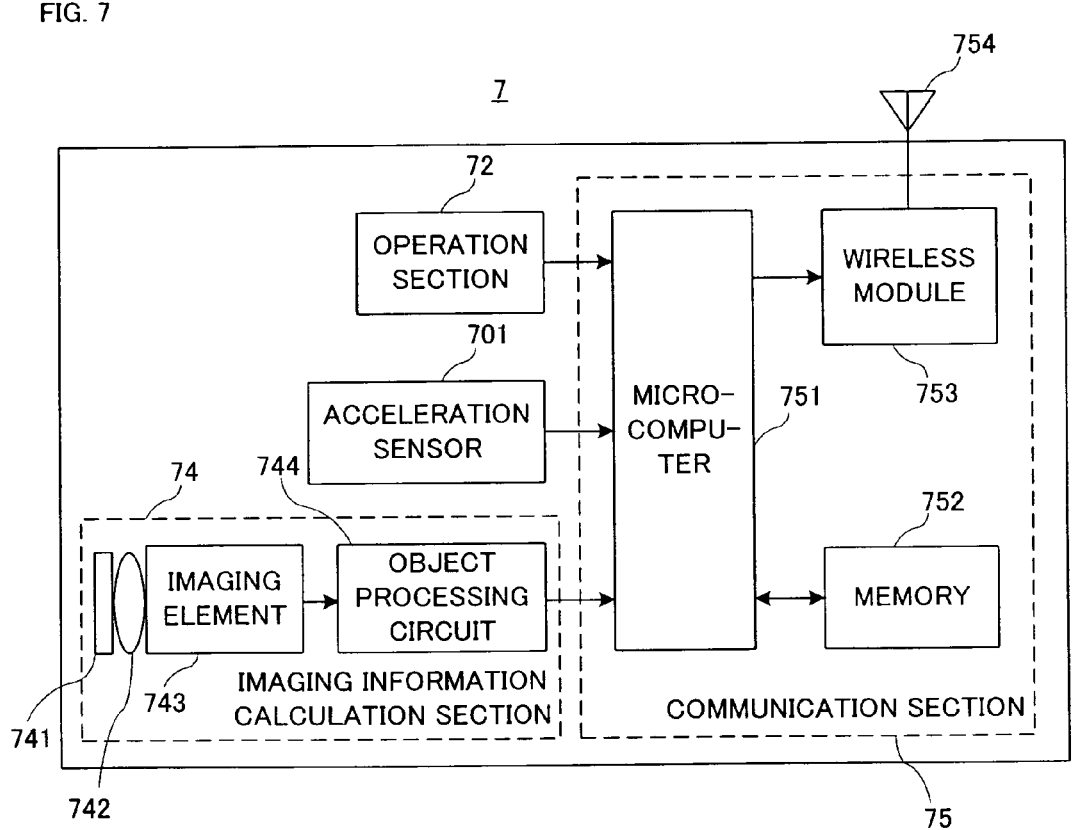
FIG. 7 is a block diagram illustrating a structure of the controller 7 shown in FIG. 3.

With respect to FIG. 7, the internal structure of the controller 7 will be described. FIG. 7 is a block diagram showing the structure of the controller 7.

As shown in FIG. 7, the controller 7 includes a communication section 75 therein in addition to the operation sections 72, the imaging information calculation section 74, the acceleration sensor 701, the vibrator 704, the speaker 706, the sound IC 707 and the amplifier 708 described above.

The imaging information calculation section 74 includes the infrared filter 741, the lens 742, the imaging element 743 and the object processing circuit 744. The infrared filter 741 allows only infrared light to pass therethrough, among light incident on the front surface of the controller 7. The lens 742 collects the infrared light which has passed through the infrared filter 741 and outputs the infrared light to the imaging element 743. The imaging element 743 is a solid-state imaging device such as, for example, a CMOS sensor or a CCD. The imaging element 743 takes an image of the infrared light collected by the lens 742. Accordingly, the imaging element 743 takes an image of only the infrared light which has passed through the infrared filter 741 for generating object data. The object data generated by the imaging element 743 is processed by the object processing circuit 744. Specifically, the object processing circuit 744 processes the object data obtained from the imaging element 743, senses an area thereof having a high brightness, and outputs the processing result data representing the detected position and size of the area to the communication section 75. The imaging information calculation section 74 is fixed to the housing 71 of the controller 7. The imaging direction of the imaging information calculation section 74 can be changed by changing the direction of the housing 71. As described below in more detail, based on the processing result data which is output from the imaging information calculation section 74, a signal in accordance with the position or motion of the controller 7 can be obtained.

The acceleration sensor 701 included in the controller 7 is preferably a three-axial (x, y and z axes) acceleration sensor. The three-axial acceleration sensor 701 detects a linear acceleration in each of three directions, i.e., an up-down direction, a left-right direction, and a front-rear direction. In another exemplary embodiment, two-axial acceleration detection means for detecting a linear acceleration in each of only the up-down direction and the left-right direction (or directions along another pair of axes) may be used depending on the type of control signals used for game processing. For example, such a three-axial or two-axial acceleration sensor 701 may be available from Analog Devices, Inc. or STMicroelectronics N.V. The acceleration sensor 701 may be of a static capacitance coupling system based on the technology of MEMS (Micro Electro Mechanical Systems) provided by silicon precision processing. Alternatively, the three-axial or two-axial acceleration sensor 701 may be based on an existing acceleration detection technology (e.g., piezoelectric system or piezoelectric resistance system) or any other appropriate technology developed in the future.

As apparent to those skilled in the art, the acceleration detection means used for the acceleration sensor 701 can detect only an acceleration along a straight line corresponding to each of the axes of the acceleration sensor 701 (linear acceleration). Namely, a direct output from the acceleration sensor 701 is a signal indicating the linear acceleration (static or dynamic) along each of two or three axes thereof. Hence, the acceleration sensor 701 cannot directly detect a physical property such as, for example, a motion, rotation, revolution, angular displacement, inclination, position or posture along a nonlinear path (e.g., an arc path).

Nonetheless, those skilled in the art would easily understand from the description of this specification that further information on the controller 7 can be estimated or calculated by executing additional processing on an acceleration signal which is output from the acceleration sensor 701. For example, when a static acceleration (gravitational acceleration) is detected, an inclination of the object (controller 7) with respect to the gravitational vector can be estimated by performing calculations based on the inclination angle and the detected acceleration, using the output from the acceleration sensor 701. By combining the acceleration sensor 701 with the microcomputer 751 (or another processor) in this manner, the inclination, posture or position of the controller 7 can be determined. Similarly, when the controller 7 including the acceleration sensor 701 is dynamically accelerated by a hand of the player or the like, various motions and/or positions of the controller 7 can be calculated or estimated by processing an acceleration signal generated by the acceleration sensor 701. In another exemplary embodiment, the acceleration sensor 701 may include a built-in signal processing device, or another type of dedicated processing device, for executing desired processing on an acceleration signal which is output from the built-in acceleration detection means, before the signal is output to the microcomputer 751. For example, when the acceleration sensor 701 is for detecting a static acceleration (e.g., a gravitational acceleration), the built-in or dedicated processing device may convert the detected acceleration signal to a corresponding inclination angle. The data indicating the acceleration detected by the acceleration sensor 701 is output to the communication section 75.

The communication section 75 includes the microcomputer 751, a memory 752, the wireless module 753, and the antenna 754. The microcomputer 751 controls the wireless module 753 for wirelessly transmitting the transmission data, while using the memory 752 as a storage area during processing. The microcomputer 751 also controls the operation of the sound IC 707 and the vibrator 704 in accordance with the data transmitted from the game apparatus main body 3 to the wireless module 753 via the antenna 754. The sound IC 707 processes sound data or the like transmitted from the game apparatus main body 3 via the communication section 75. The microcomputer 751 actuates the vibrator 704 in accordance with, for example, the vibration data (e.g., a signal for turning the vibrator 704 on or off) transmitted from the game apparatus main body 3 via the communication section 75.

Data from the controller 7 including an operation signal (key data) from the operation section 72, acceleration signals in the three axial directions (x-axis, y-axis and z-axis direction acceleration data; hereinafter, referred to simply as "acceleration data") from the acceleration sensor 701, and the processing result data from the imaging information calculation section 74 are output to the microcomputer 751. The microcomputer 751 temporarily stores the input data (key data, acceleration data, and the processing result data) in the memory 752 as transmission data which is to be transmitted to the communication unit 6. The wireless transmission from the communication section 75 to the communication unit 6 is performed at a predetermined time interval. Since game processing is generally performed at a cycle of ⅙₀ sec., the wireless transmission needs to be performed at a cycle of a shorter time period. Specifically, the game processing unit is 16.7 ms (⅙₀ sec.), and the transmission interval of the communication section 75 structured using the Bluetooth (registered trademark) technology is, for example, 5 ms. At the transmission timing to the communication unit 6, the microcomputer 751 outputs the transmission data stored in the memory 752 as a series of operation information to the wireless module 753. Based on the Bluetooth (registered trademark) technology, the wireless module 753 uses a carrier wave of a predetermined frequency to convert the operation information and radiate the carrier signal from the antenna 754. Namely, the key data from the operation section 72, the acceleration data from the acceleration sensor 701, and the processing result data from the imaging information calculation section 74 are converted into a carrier signal by the wireless module 743 and transmitted from the controller 7. The communication unit 6 of the game apparatus main body 3 receives the carrier wave signal, and the game apparatus main body 3 demodulates or decodes the carrier wave signal to obtain the series of operation information (the key data, the acceleration data, and the processing result data). Based on the obtained operation information and the game program, the CPU 30 of the game apparatus main body 3 performs the game processing. In the case where the communication section 75 is structured using the Bluetooth (registered trademark) technology, the communication section 75 can have a function of receiving transmission data which is wirelessly transmitted from other devices.

First Exemplary Embodiment

Next, with reference to FIG. 8 through FIG. 12, an overview of character object generation processing (hereinafter, referred to simply as "object generation processing") executable in this exemplary embodiment will be described. In an MMORPG (Massively Multiplayer Online Role Playing Game) or the like, a user character object as the user's other self is created. In this exemplary embodiment, the description will be given mainly on creation of an object of a face. The certain exemplary embodiments also applicable to creation of an object of the entire body of the character, as well as creation of a face object.

Figure 8:
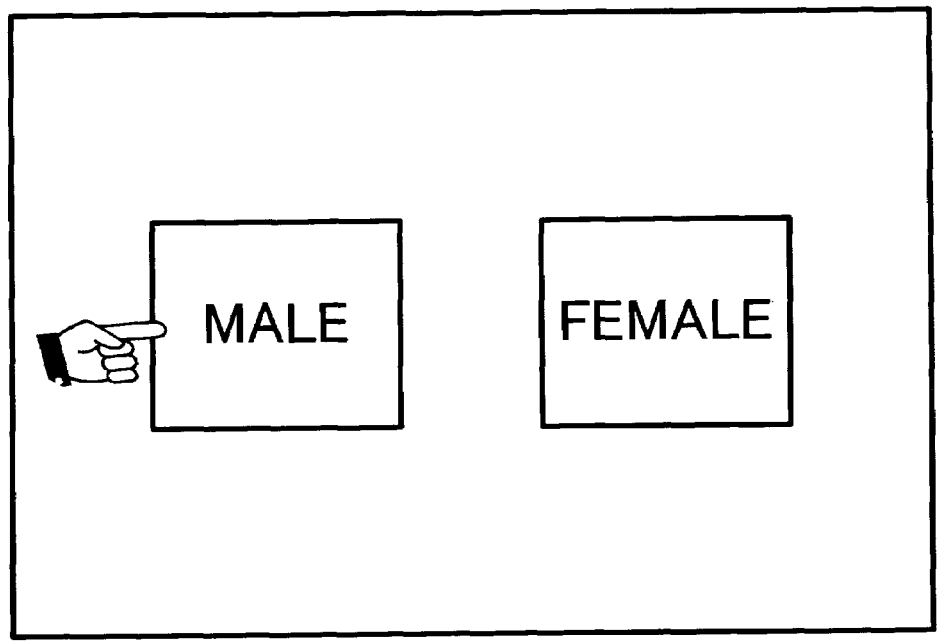
FIG. 8 shows an exemplary game screen displayable in a first exemplary embodiment.
Figure 9:
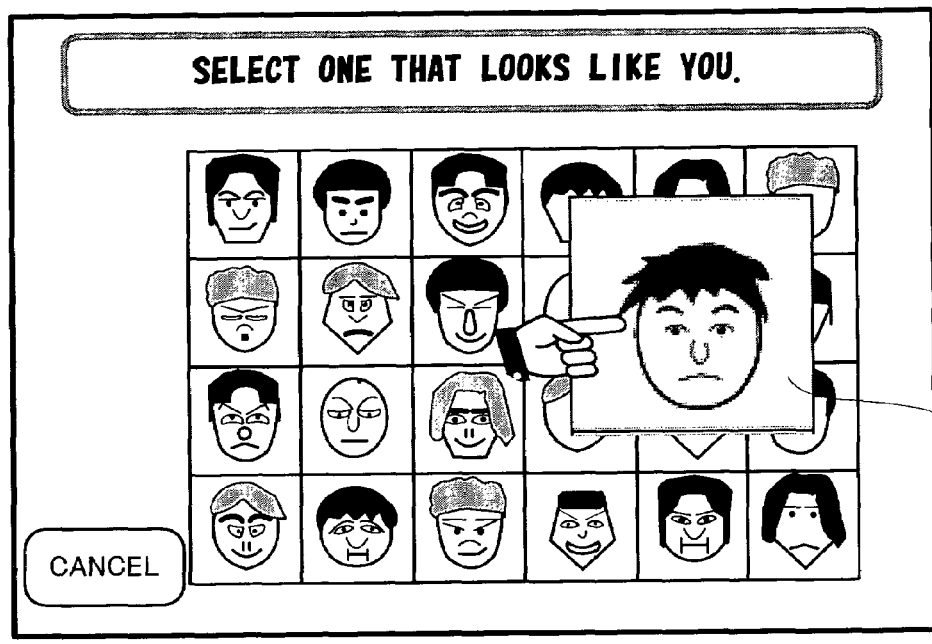
FIG. 9 shows another exemplary game screen displayable in the first exemplary embodiment.
Figure 10:
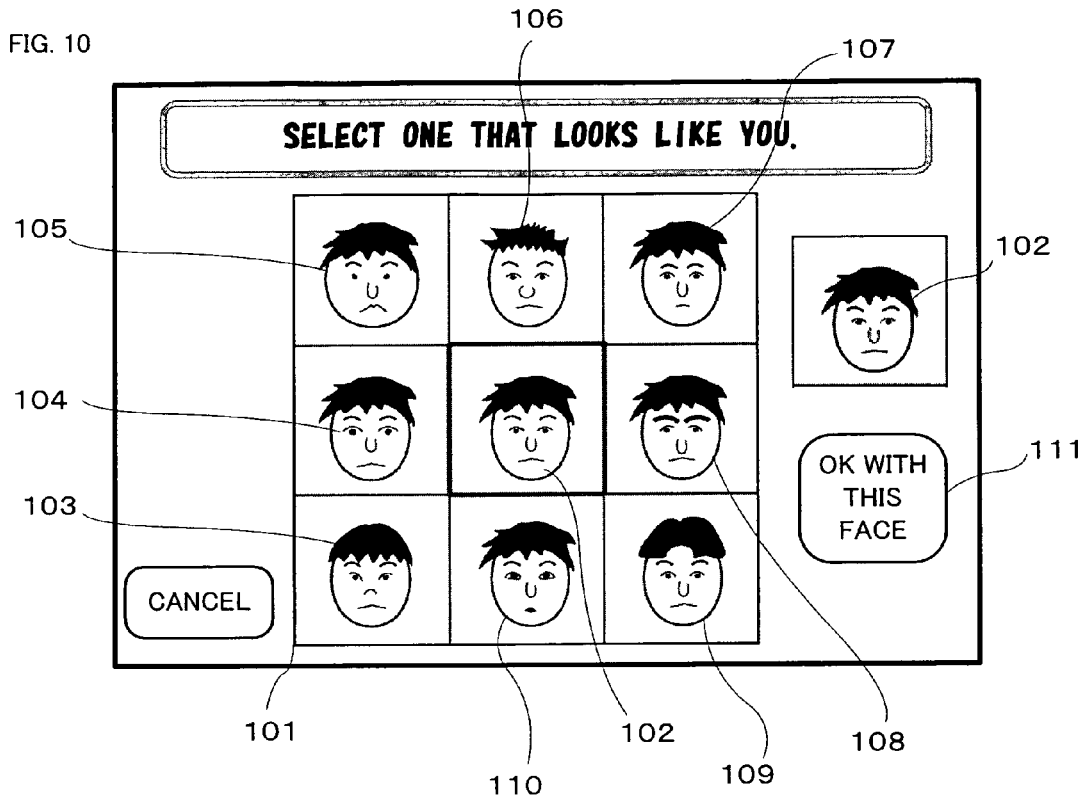
FIG. 10 shows still another exemplary game screen displayable in the first exemplary embodiment.

FIG. 8 through FIG. 12 each show an exemplary screen in the object generation processing executable in this exemplary embodiment. In this exemplary embodiment, a gender selection screen as shown in FIG. 8 is first displayed to allow the user to select a gender. Then, based on the selected gender, 24 face objects are randomly generated. As shown in FIG. 9, an initial object selection screen is displayed to allow the user to select one of the face objects. In this example, it is assumed that the user selected a face object 91. (The selected face object is shown larger than the other objects in FIG. 9.) Next, as shown in FIG. 10, an object selection screen is displayed. In FIG. 10, a 3×3 grid is displayed at the center of the screen (hereinafter, such a grid will be referred to as a "matrix area 101"). In the central square, the face object 91 selected by the user is displayed. Hereinafter, the face object displayed in the central square will be referred to as a "reference object 102". Then, a total of eight face objects (objects 103 through 110) similar to the reference object 102 are generated and displayed in the eight peripheral squares surrounding the central square. Hereinafter, the face objects displayed in the eight peripheral squares will be referred to as "candidate objects". In a right part of the screen, the reference object 102 is displayed, and a "determine" or "OK" button 111 is displayed therebelow. When the user has no problem with the reference object 102 as a face object to be created, the user can press the "determine" button 111 to determine the reference object 102 as the final face object.

Figure 11:
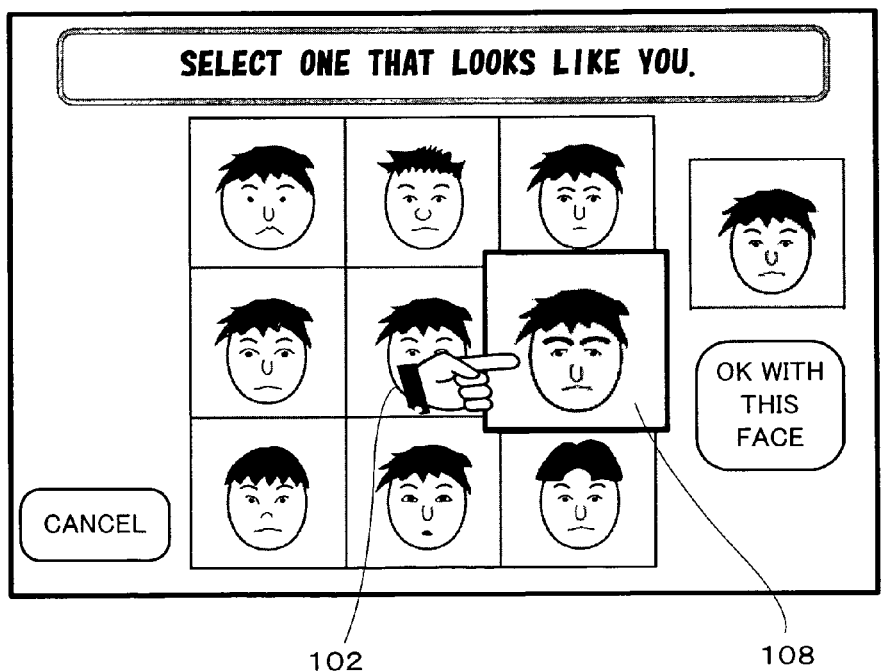
FIG. 11 shows still another exemplary game screen displayable in the first exemplary embodiment.
Figure 12:
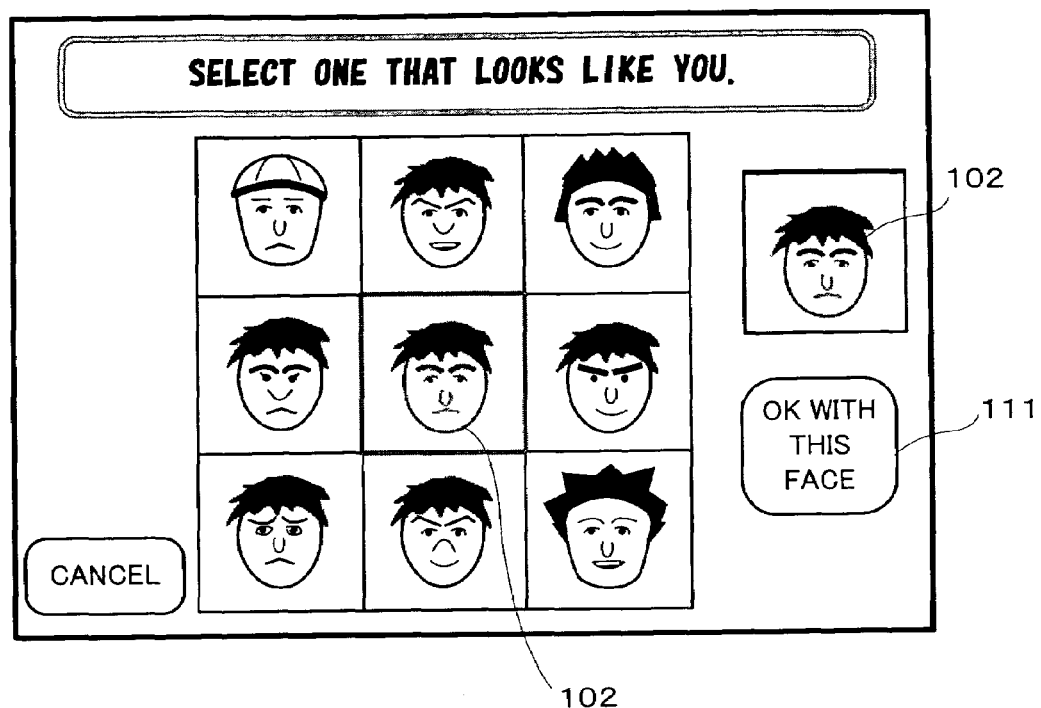
FIG. 12 shows still another exemplary game screen displayable in the first exemplary embodiment.

By contrast, when the user is not satisfied with the reference object 102, the user selects one of the candidate objects 103 through 110 displayed in the eight peripheral squares. In this example, it is assumed as shown in FIG. 11 that the user selected the candidate object 108. Then, as shown in FIG. 12, the candidate object 108 selected by the user is displayed in the central square as the reference object 102. Then, eight new candidate objects are generated based on the new reference object 102 and displayed in the eight peripheral squares. When the user is satisfied with the new reference object 102, the user presses the "determine" button 111 to determine the final face object. When the user is not satisfied even with the new reference object 102, the user selects one of the eight candidate objects. The selected candidate object is displayed in the central square of the matrix area 101 as the reference object, and new candidate objects are generated and displayed in the eight peripheral squares as described above. By repeating this procedure, the user generates a face he/she intends.

Namely, the user selects an object which he/she feels is close to an object he/she wishes to generate from among a reference object and candidate objects similar to the reference object, which are displayed on the screen. When the user selects one of the candidate objects, new candidate objects similar to the selected object are created using the selected object as the reference object, and displayed. The user again selects one of the displayed reference object and candidate objects. By repeating such a semi-passive selection operation, the face objects displayed on the screen gradually become closer to the face object the user wishes to generate. As a result, the user can select the desired face object.

In this exemplary embodiment, the generation of the candidate objects is executed with an attention being paid to differences between the reference object and the current candidate objects. Specifically, for example, it is assumed that the reference object 102 in FIG. 11 and the selected candidate object 108 are different in the part object of eyebrow and eye and are the same in the other part objects. In this case, it is considered that the user wants to positively change the sites of eyebrow and eye. Thus, candidate objects in which the part objects of these sites are altered with priority are generated. In this manner, the probability that the face objects desired by the user are displayed is improved.

Figure 13:
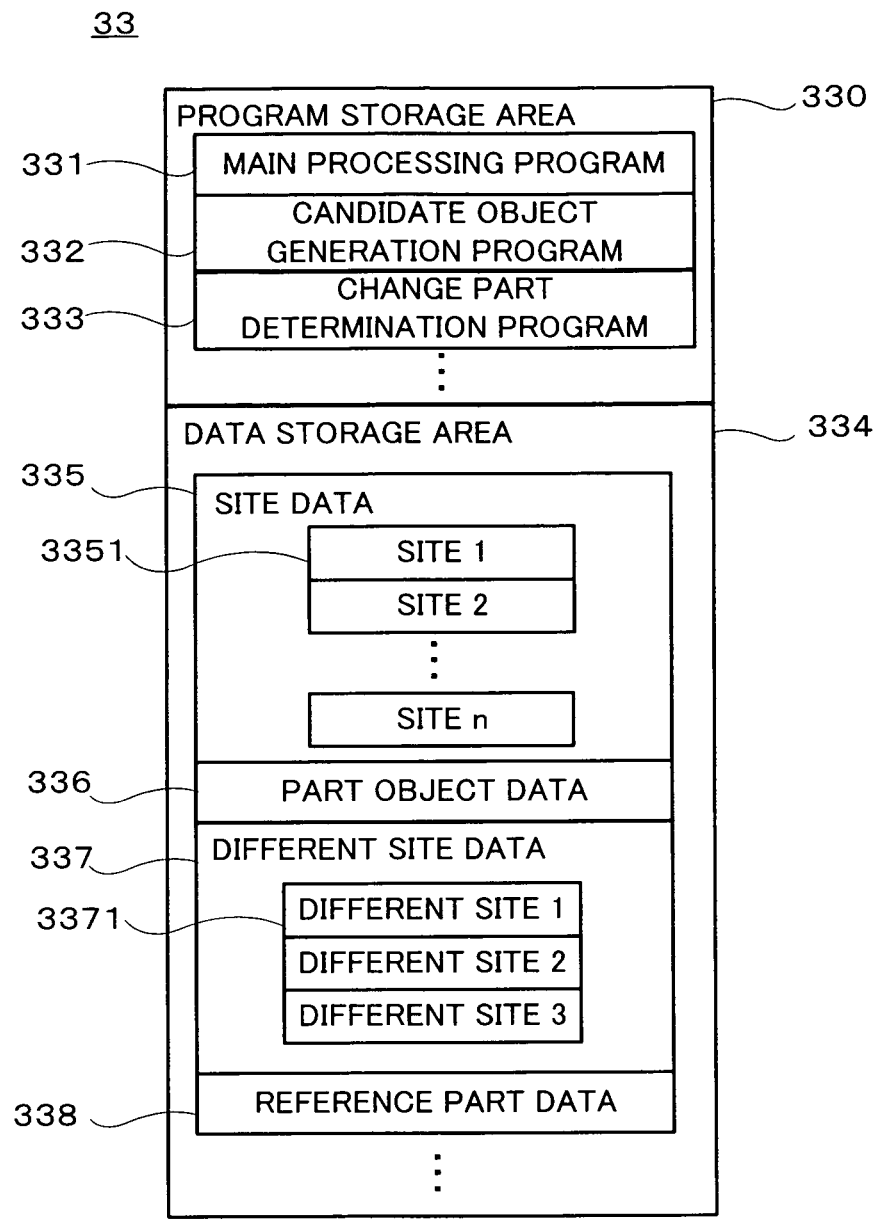
FIG. 13 shows a memory map of a main memory 33.

Next, the object generation processing executed by the game apparatus main body 3 will be described in detail. First, with reference to FIG. 13 through FIG. 18, main data used for the object generation processing will be described. FIG. 13 shows a memory map of the main memory 33 shown in FIG. 2. As shown in FIG. 13, the main memory 33 includes a program storage area 330 and a data storage area 334.

The program storage area 330 stores a program to be executed by the CPU 30, and the program includes a main processing program 331, a candidate object generation program 332, a change part determination program 333 and the like. The main processing program 331 corresponds to a flowchart shown in FIG. 19 and described later. The candidate object generation program 332 is for generating the above-described candidate objects and corresponds to a flowchart shown in FIG. 21. The change part determination program 333 is for determining a part which is a target of change when generating candidate objects, and corresponds to a flowchart shown in FIG. 22.

The data storage area 334 stores site data 335, part object data 336, different site data 337, reference part data 338 and the like. The data storage area 334 also stores other data necessary for the object generation processing, including data on background objects of various game screens.

The site data 335 is data on each of sites included in a face object, and is a set of sites 3351. For example, "eye", "nose", "mouth" and the like each correspond to a site 3351.

Figure 15:
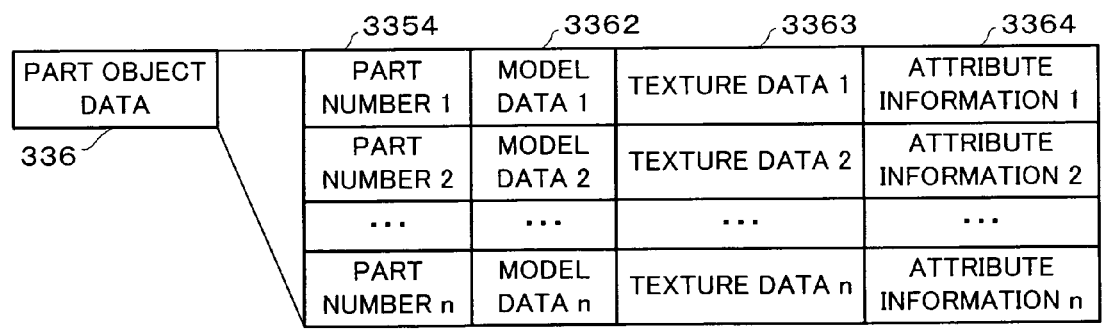
FIG. 15 shows a data structure of part object data 336.

The part object data 336 stores data on part objects each assigned a unique number, as described later in more detail with reference to FIG. 15.

The different site data 337 stores information on a site for which different part objects are used for the reference object and the candidate object selected by the user. In this exemplary embodiment, the number of sites which are different between the reference object and each candidate object is three.

The reference part data 338 is information on each of parts included in the reference object 102.

Figure 14:
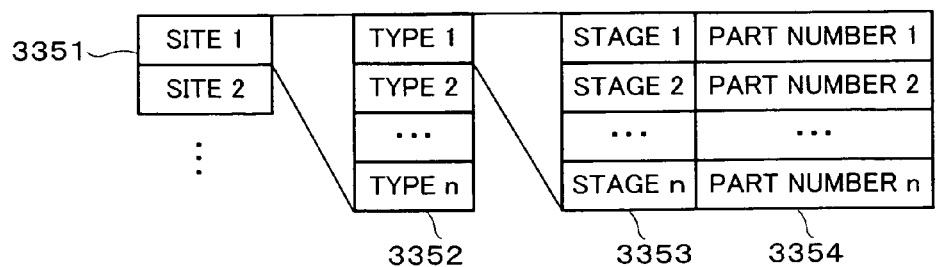
FIG. 14 shows a data structure of sites 3351.

Now, the site data 335 will be described in detail. Each site 3351 includes a type, a stage and a part number. FIG. 14 shows a data structure of each site 3351 in detail. A site 3351 is a set of a plurality of types 3352. Each type 3352 is a set of stages 3353 and part numbers 3354. Each type 3352 itself is managed by a number assigned thereto (e.g., type 1, type 2, type 3, ... type n).

Next, with reference to FIG. 16 and FIG. 17, the type 3352 and the stage 3353 will be described. In this exemplary embodiment, a type 3352 is used for grouping part objects of each site included in a face. For example, in the case of the site of "eye", similar shapes, such as "an eye with a lifted outer corner" or "an eye with a drooping corner", are grouped as one "type". For each type, the part objects are arranged as gradually and sequentially changing when stored in the main memory 33. For example, in the case of the site of "nose", the part objects are arranged from small nose to large nose. Namely, the part objects arranged side by side are more similar to each other than the part objects arranged far from each other.

Each type 3352 includes stages 3353 and part numbers 3354. A stage 3353 represents the turn of a certain part number among the part numbers stored for each type. In other words, the stage 3353 represents the position at which the certain part number is stored for each type. A part number 3354 is an ID for specifying a part object. FIG. 16 shows an example of the number of types and stages for each site. In FIG. 16, for example, the part objects for "eye" are grouped into nine types, and each type has 4, 5 or 6 stages. FIG. 17 shows an example of the relationship among the type, stage and part number. For each site, a particular part number 3354 is specified by the combination of the type 3352 and the stage 3353.

Figures 16, 17, 18:
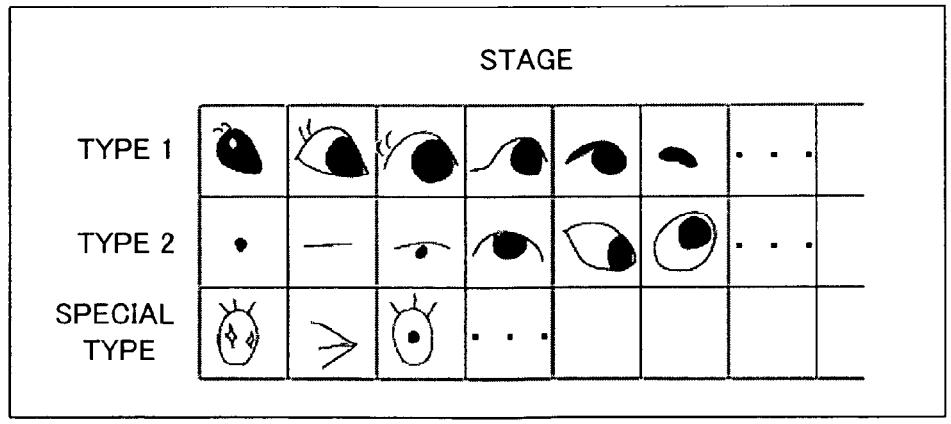
FIG. 16 shows an example of the number of types and stages for each site.
FIG. 17 shows an example of the relationship among the type, stage and part number.
FIG. 18 shows an example of the relationship between the type and the stage for "eye"

FIG. 18 shows an example of the relationship between the type and the stage for the site of "eye". In FIG. 18, for easier understanding, specific part objects are shown instead of part numbers 3354 each corresponding to a combination of the type 3352 and the stage 3353. The part objects are stored in an ascending order of the stage number for each type. For example, in the case of the "eye with a lifted outer corner", the part objects are arranged as gradually and sequentially changing in terms of the shape, color and the like as described above. Referring to FIG. 18, the parts objects are arranged as gradually and sequentially changing from left to right. For example, the eye of stage 1 and the eye of stage 2 are very similar to each other in terms of shape and color. By contrast, the eye of stage 1 and the eye of stage 5, although both belonging to the type of "eye with a lifted outer corner", are not as similar to each other as the eye of stage 1 and the eye of stage 2. The order of storage is determined based on the external appearance of actual part objects, for example, the shape of the eye. Therefore, as shown in FIG. 17, the turn of the part objects and the similarity between the part objects do not necessarily match each other. Namely, the part objects are not necessarily stored in the order of the part number.

Now, the "special type" shown in FIG. 17 and FIG. 18 will be described. The "special type" is a type of extremely unique part objects which do not belong to any of the above types. The part objects of a special type are extremely characteristic in terms of the shape or the like, and so are not similar to one another. Therefore, such part objects are not necessarily stored as being gradually and sequentially changing.

Next, with reference to FIG. 15, the part object data 336 will be described in detail. The part object data 336 is a set of part numbers 3354, model data 3362, texture data 3363, and attribute information 3364. The part numbers 3354 are the same as those included in the types 3352. Namely, a part number 3354 is an ID for associating a site and a part object displayed for the site. The model data 3362 is data on a polygon model of a corresponding part object. The texture data 3363 is data on a texture pasted on the polygon model. In other words, one part object displayed on the screen is formed of a polygon model and a texture pasted thereon. The attribute information 3364 is information representing the attribute of each part object. For example, information on whether the part object is for a man or a woman is stored as the attribute information 3364.

Next, with reference to FIG. 19 through FIG. 22, the object generation processing executed by the game apparatus main body 3 will be described. When the game apparatus main body 3 is turned on, the CPU 30 of the game apparatus main body 3 executes a start program stored on a boot ROM (not shown) to initialize the elements including the main memory 33. The game program stored on the optical disc 4 is read to the main memory 33, and thus the CPU 30 starts executing the game program. The flowcharts shown in FIG. 19 through FIG. 22 illustrate the object generation processing executed after the above-described processing is completed.

Figure 19:
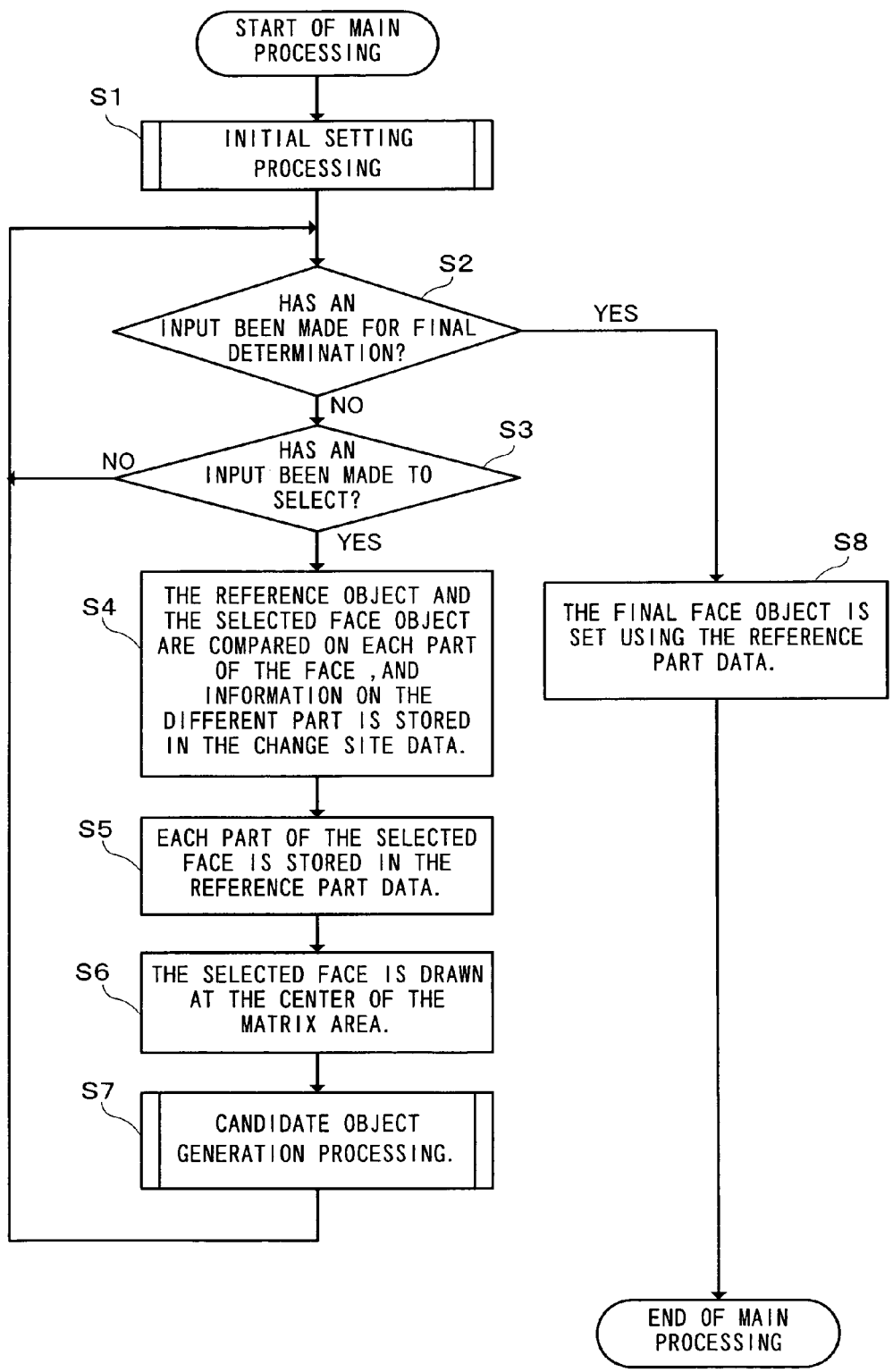
FIG. 19 is a flowchart illustrating game processing in the first exemplary embodiment.
Figure 20:
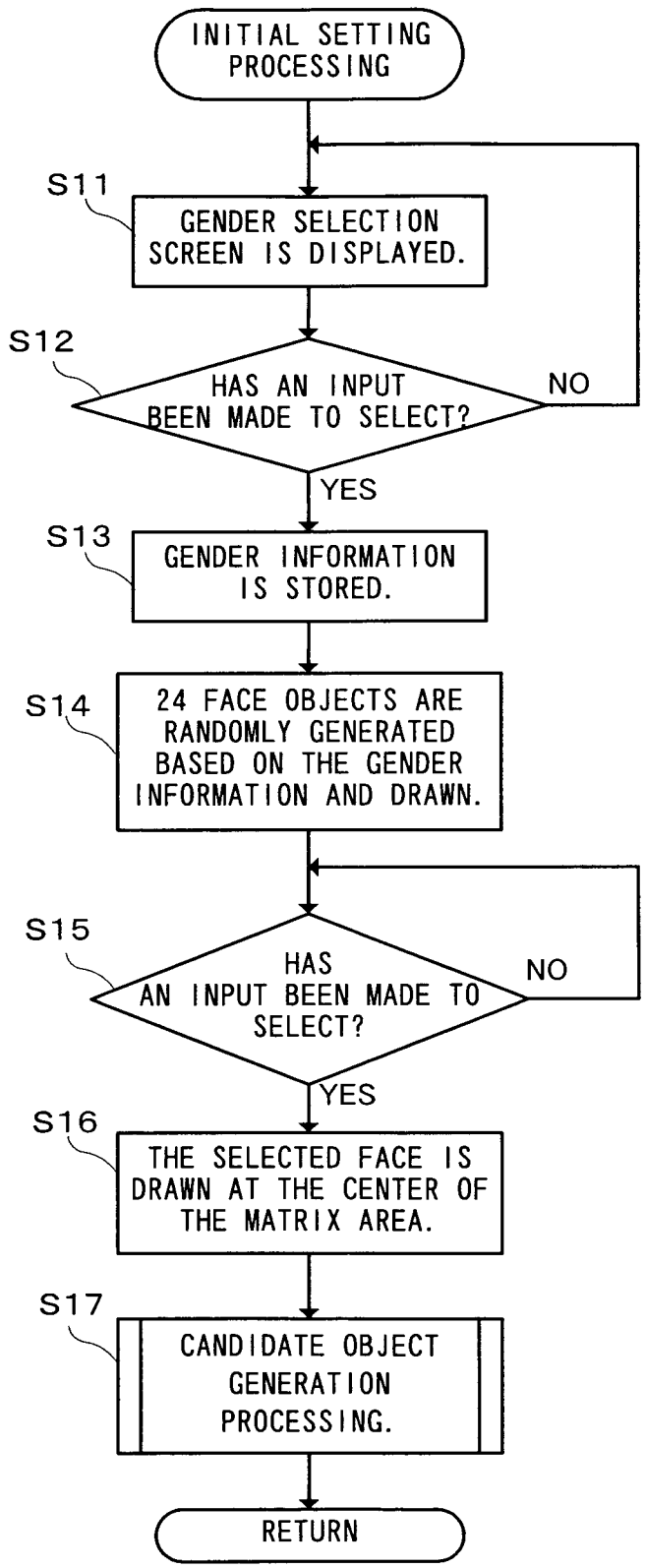
FIG. 20 is a flowchart illustrating initial setting processing shown in step S1 in FIG. 19 in detail.

Referring to FIG. 19, the CPU 30 first executes initial setting processing (step S1). FIG. 20 is a flowchart illustrating the initial setting processing in step S1 in detail. Referring to FIG. 20, the CPU 30 displays a gender selection screen as shown in FIG. 8 (step S11). Then, the CPU 30 waits for an input to select a gender from the user (step S12). Namely, the CPU 30 repeats the display of the gender selection screen, for example, frame by frame until the user makes an input (NO in step S12). When the user makes an input (YES in step S12), the CPU 30 advances the processing.

Next, the CPU 30 stores the information on whether the gender selected by the user is male or female in the main memory 33 as gender information (step S13). Then, the CPU 30 randomly reads a part object for each site from the part object data 336 based on the gender information. For example, when the selected gender is male, the CPU 30 refers to the attribute information 3364 to randomly select and read a part object (a set of the model data 3362 and the texture data 3363). The CPU 30 combines the read part objects to generate 24 face objects and displays the face objects in a matrix as shown in FIG. 9 (step S14). The CPU 30 waits for the user to make an input (step S15). When the user makes an input (YES in step S15), the CPU 30 advances the processing.

The CPU 30 executes processing for displaying the object selection screen as shown in FIG. 10. First, the CPU 30 sets the face object selected by the user in step S15 as a reference object and draws such an object in the central square in the matrix area 101 (step S16). At this point, the CPU 30 stores the part numbers of the part objects included in the reference object in the reference part data 338 in association with the respective sites.

Next, the CPU 30 executes candidate object generation processing described later in order to generate candidate objects and draw such objects in the eight peripheral squares of the matrix area 101 (step S17). Thus, the initial setting processing is terminated. At this point, the screen as shown in FIG. 10 is displayed.

Returning to FIG. 19, after the initial setting processing in step S1, the CPU 30 determines whether or not an input has been made on final determination (step S2). Namely, it is determined whether or not the "determine" button 111 in FIG. 10 has been pressed. When it is determined that no input has been made on final determination (NO in step S2), the CPU 30 determines whether or not an input has been made to select any of the candidate objects (step S3). When it is determined that no input has been made to select any of the candidate objects (No in step S3), the CPU 30 returns the processing to step S2 to repeat the steps.

When it is determined that an input has been made to select a candidate object (YES in step S3), the CPU 30 detects a site for which different part objects are used between the selected candidate object and the reference object (hereinafter, referred to as a "different site"). This is performed by, for example, comparing the part numbers 3354 for each site. Since the objects are different at up to three sites in this exemplary embodiment as described above, a total of three different sites are detected. The CPU 30 stores the information on the different sites in the different site data 337 (step S4).

The CPU 30 stores the part numbers 3354 corresponding to the part objects included in the selected candidate object in the reference part data 338 (step S5). Namely, the selected candidate object is set as the new reference object.

The CPU 30 draws the selected candidate object (i.e., the new reference object) in the central square of the matrix area 101 (step S6).

The CPU 30 executes the candidate object generation processing in order to generate candidate objects to be displayed in the eight peripheral squares of the matrix area 101 (step S7). The candidate object generation processing, which is the same as the processing in step S17 in FIG. 20, will be described later in detail. As a result of this processing, the screen as shown in FIG. 12 is displayed. The CPU 30 returns to step S2 to repeat the steps.

When it is determined in step S2 that an input has been made on final determination (YES in step S2), the CPU 30 refers to the reference part data 338 to set a final face object using the part objects included in the reference object (reference parts) (step S8). Thus, the main processing shown in FIG. 19 is terminated.

Figure 21:
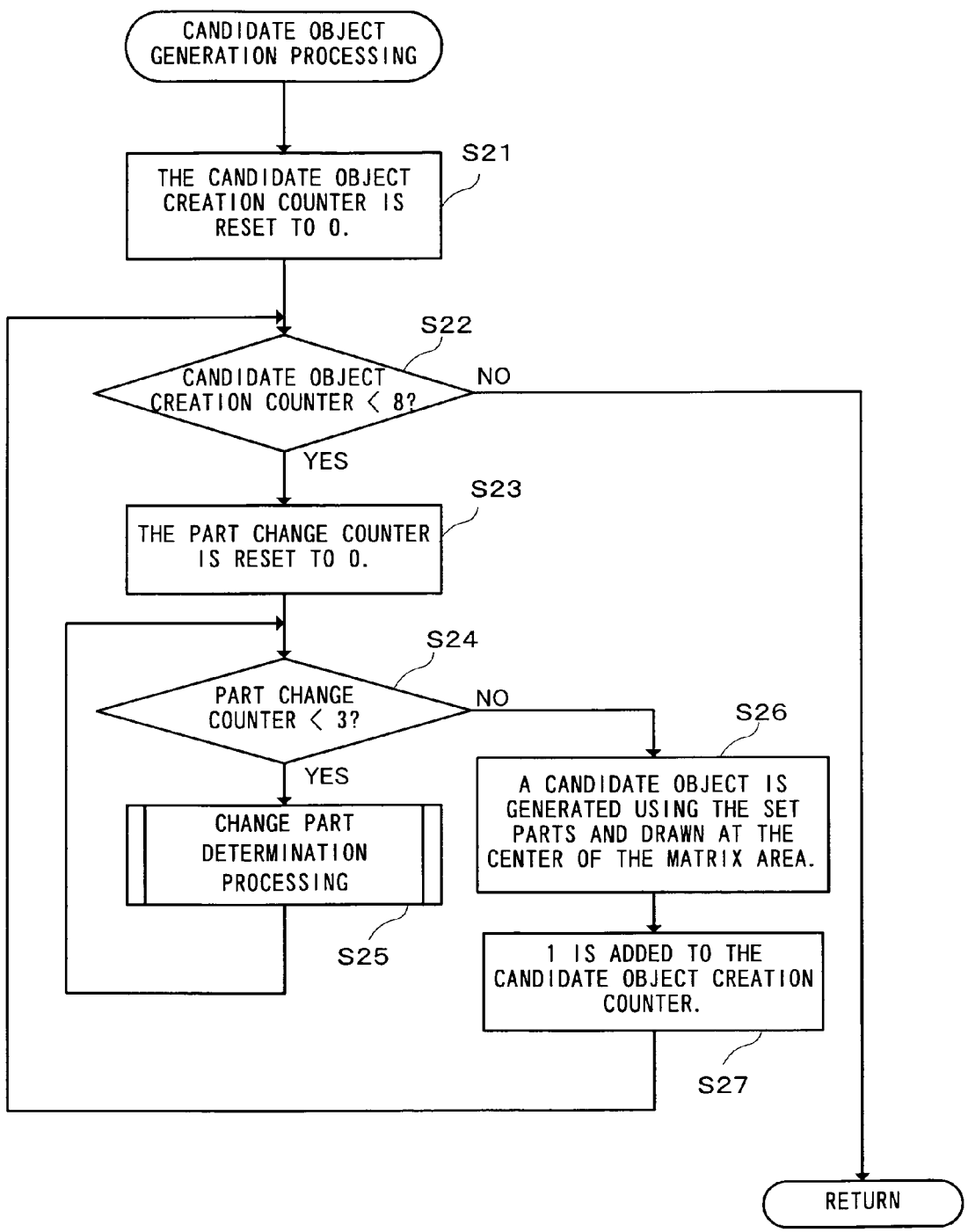
FIG. 21 is a flowchart illustrating candidate object generation processing shown in step S17 and the like in FIG. 20 in detail.

Next, the candidate object generation processing executed in steps S7 and S17 will be described. FIG. 21 is a flowchart illustrating the candidate object generation processing in detail. In this processing, eight face objects (candidate objects) similar to the face object selected by the user (reference object) are generated. As described above, the number of sites at which the reference object and each candidate object are different from each other is three. Therefore, a candidate object is generated by changing three part objects among the part objects included in the reference object. Eight such candidate objects are generated.

Referring to FIG. 21, the CPU 30 first sets a candidate object creation counter to zero. The candidate object creation counter is a variable for counting the number of candidate objects generated so far (step S21).

Next, the CPU 30 determines whether or not the candidate object creation counter is less than 8 (step S22). Namely, it is determined whether or not eight candidate objects have been generated.

The CPU 30 sets a part change counter to zero (step S23). The part change counter is a variable for counting the number of parts determined as change target parts for generating a candidate object in change part determination processing described later (step S25) (i.e., the number of sites to be changed).

The CPU 30 determines whether or not the part change counter is less than 3 (step S24). Namely, it is determined whether or not three sites to be the change targets (hereinafter, referred to as the "change target sites") have been determined. When it is determined that the part change counter is less than 3 (YES in step S24), the CPU 30 executes the change part determination processing described later in order to determine a part object for the change target site (step S25).

When it is determined that the part change counter is 3 or greater (NO in step S24), it means that three change target sites have been determined. Therefore, the CPU 30 generates one candidate object reflecting the changes (step S26). More specifically, for each change target site determined in the change part determination processing, a part object is read based on the post-change part number 3354 determined in the change part determination processing. For the sites other than the three change target sites, the same part objects as those of the reference object are used. Thus, the candidate object is generated. Namely, a candidate object which is different from the reference object in three part objects is generated. The generated candidate object is drawn in any of the eight peripheral squares of the matrix area 101.

Then, CPU 30 adds 1 to the candidate object creation counter (step S27), and returns the processing to step S22. When it is determined that the candidate object creation counter is 8 or greater (NO in step S22), the candidate object generation processing is terminated. By such processing, eight candidate objects displayed in the selection screen in FIG. 10 and FIG. 12 are generated and drawn.

Figure 22:
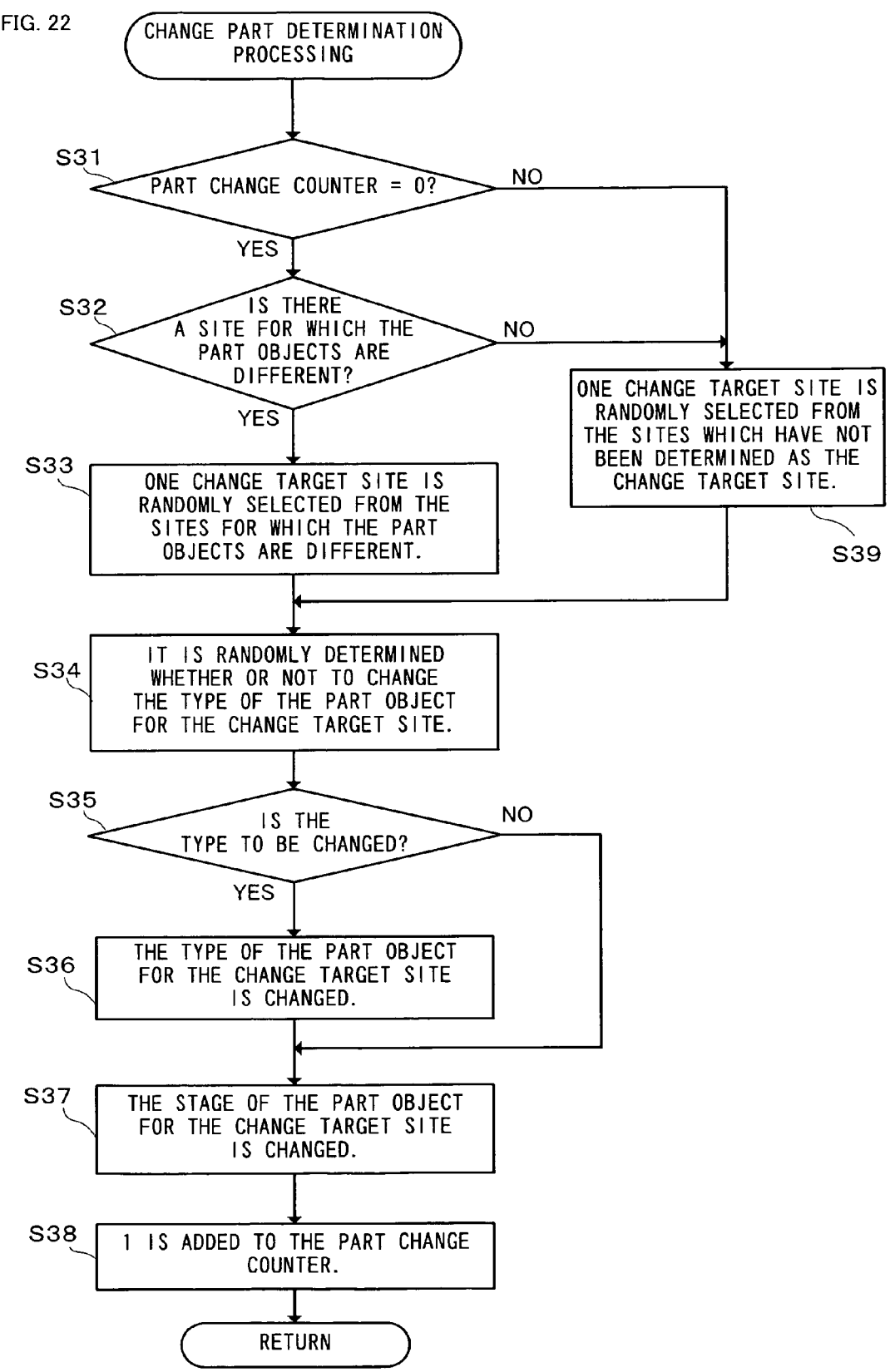
FIG. 22 is a flowchart illustrating change part determination processing shown in step S25 in FIG. 21 in detail.

Next, the change part determination processing in step 25 will be described. FIG. 22 is a flowchart illustrating the change part determination processing in detail. In this processing, the post-change part numbers 3354 (i.e., part objects) of the three change target sites among the part objects included in the reference object are determined. Roughly stated, the change target sites are first determined, it is then determined whether or not to change the type 3352 of each such site, and the number of stages for the change is determined.

Referring to FIG. 22, the CPU 30 determines whether or not the part change counter is 0 (step S31). Namely, it is determined whether or not at least one change target site has been determined. For generating one candidate object, the change part determination processing is executed three times (because there are three sites to be changed). In this step, it is determined whether or not the current processing is the first of those three. When it is determined that the part change counter is 0, namely, when the current processing is the first of the three (YES in step S31), the CPU 30 refers to the different site data 337 to determine whether or not there are sites for which different part objects are used between the reference object and the candidate object (the above-mentioned three different sites) (step S32). When it is determined that there are such different sites (YES in step S32), the CPU 30 randomly selects one of the three different sites (step S33). For example, when the candidate object is different from the reference object at the three sites of "eye", "nose" and "mouth", the CPU 30 randomly selects one of the "eye", "nose" and "mouth" as a change target site. In other words, in the first loop of the change part determination processing for generating one candidate object, a change target site is selected from the three different sites between the selected candidate object and the reference object. This is performed in order to determine the site that the user wishes to change as a change target site with priority.

When it is determined in step S31 that the part change counter is not 0, namely, when the current processing is the second or thereafter of the three (NO in step S31), the CPU 30 randomly selects a change target site from the sites which have not been selected yet (step S39). For example, when "eye" is already selected as the change target site in the first loop of the change part determination processing, a change target site is randomly selected from the sites other than "eye" (including "nose" and "mouth"). When, for example, "eyebrow" is selected in the second loop of the change part determination processing, a change target site is randomly selected from the sites other than "eye" and "eyebrow" in the third loop.

When it is determined in step S32 that there is no difference site, the processing in step S39 is executed. This occurs, for example, in the candidate object generation processing in the initial setting processing (step S1 in FIG. 19) (i.e., when a candidate to be displayed first is generated) or when the reference object is selected in the processing after the initial setting processing.

Additionally regarding the processing in step S39, the following should be noted. In this step, a change target site is randomly selected from the sites which have not been selected. At this point, the gender information is considered. For example, "beard" or "mustache" is a site limited to men and is not selected when the gender information represents a woman.

After the change target sites are determined in step S33 or S39, the CPU 30 randomly determines whether or not to change the type 3352 to which the part number 3354 corresponding to the part object of each change target site belongs (step S34). For example, referring to FIG. 17, in the case where the part object of stage 4 of type 3 is used, it is randomly determined whether or not to change type 3 to another type. In this step, the probability at which it is determined to change the type is preferably set to lower than expected. In an exceptional case where the part object of the change target site is of a special type, it is absolutely preferable to change the type.

The CPU 30 determines whether or not the type 3352 is determined in step S34 to be changed (step S35). When it is determined in step S35 that the type 3352 is to be changed (YES in step S35), the type 3352 of the change target site selected in step S33 or S39 among the sites of the reference object is changed (step S36). This processing in step S36 will be described more specifically with reference to FIG. 17 used above. It is now assumed that the part object corresponding to stage 3 of type 5 is set for the site of "eye" of the reference object. In this case, a calculation is performed using an equation which produces 0 or 1 using random numbers. When the result is 0, the number of the type is subtracted by 1. For example, type 5 is changed to type 4. By contrast, when the result is 1, the number of the type is added by 1. For example, type 5 is changed to type 6. In this manner, the type is changed in this step.

Returning to FIG. 22, when it is determined in step S35 that the type 3352 is not to be changed (NO in step S35), the CPU 30 advances the processing to step 37 without executing the processing in step S36.

The CPU 30 changes the stage 3353 in order to change the part object of each change target site (step S37). The processing in this step will be specifically described with reference to FIG. 17. When the type 3352 is not changed in step S36, the stage 3353 is changed in the range of ±2 with respect to the current stage. The current stage is not re-selected. Referring to FIG. 17, it is assumed that the current type is 4 and the current stage is stage 3. The new stage is randomly selected from stage 1, stage 2, stage 4 and stage 5. A calculation is performed using an equation which produces a numerical value of 0 through 3 using random numbers. For example, it is set so that when the result is 0, stage 1 is selected; when the result is 1, stage 2 is selected; when the result is 2, stage 4 is selected; and when the result is 3, stage 5 is selected. As described above, the part numbers 3354 are arranged as the corresponding part objects are gradually and sequentially changing. Therefore, by selecting stages close to the current stage, a part object similar to the current part object can be selected.

When the type 3352 is changed in step S36, a stage is randomly selected from all the stages 3353 belonging to the post-change type 3352. For example, referring to FIG. 17, type 6 has seven stages. Therefore, a stage is randomly selected from stage 1 through stage 7.

After the stage 3353 is changed, the CPU 30 adds 1 to the part change counter (step S38). The CPU 30 also stores the part number 3354 derived from the post-change type 3352 and the post-change stage 3353 in the main memory 33. Thus, the change part determination processing is terminated. By this processing, the sites to be changed when generating a candidate object and the part number 3354 representing the post-change part object can be determined.

Thus, the object generation processing in the first exemplary embodiment is terminated.

As described above, in the first exemplary embodiment, for at least one of the sites for which different part objects are used between the reference object and the candidate object, the part object is changed. Thus, the part object of the site which is considered as the site the user wishes to change can be changed with priority. Therefore, a candidate object desired by the user can be more easily generated. The user only needs to repeat the operation of selecting one object among the objects displayed, as the object generation operation. As compared to the case in which the user needs to select one part object for each of a plurality of sites to generate an object, the load on the user for the object generation procedure is alleviated. Even a user who is not good at drawing or painting can easily generate an object as intended.

As shown in FIG. 18, the part object data in the main memory 33 includes part objects arranged as gradually and sequentially changing. By simply reading an object stored at a position close to the position of the part object currently displayed, a highly similar part object can be displayed.

When selecting a change target site in step S39, the probability that some unique sites, among the sites included in a face object, are selected as a change target site may be set to high. For example, the probability that "glasses", "beard", "mustache" or other sites which are considered to be unique and characteristic among the sites included in a face object are selected in step S39 may be set to high. The reason is that such a site relatively easily represents a feature of a character and therefore the user tends to change such a site more than the other sites. Thus, an object desired by the user can be more easily generated while improving the convenience for the user.

In steps S31 through S33 in the change part determination processing, one of the three different sites are randomly selected as a change target site. The certain exemplary embodiments are not limited to this, and two or all of the three different sites may be selected. Thus, the sites which are considered to be the sites that the user wishes to change can be changed with high priority.

In addition, the number of times that the part object was changed may be accumulated for each site. Regarding a site which has been changed a predetermined or greater number of times, the part objects for such a site may be separately displayed, for example, in a separate window. In this case, the displayed part objects may be only part objects at stages within a predetermined range centered around the stage of the part object of the reference object which is the change target site (i.e., only the part objects which are highly similar to the current part object). Thus, for a site for which the part object has been changed many times, the part objects desired by the user are made more easily selectable.

As described above regarding the overall procedure of this exemplary embodiment, the certain exemplary embodiments are not limited to the face object and is applicable to various objects included in the entire body of a character, for example, a chest object, a belly object, an arm object or a leg object. In the case of an arm object, the diameter of the arm, or accessories such as elbow pad, bracelet, gloves or the like, may be treated in the same manner as the profile, eye, nose, mouth or the like of a face object.

Second Exemplary Embodiment

Figure 24:
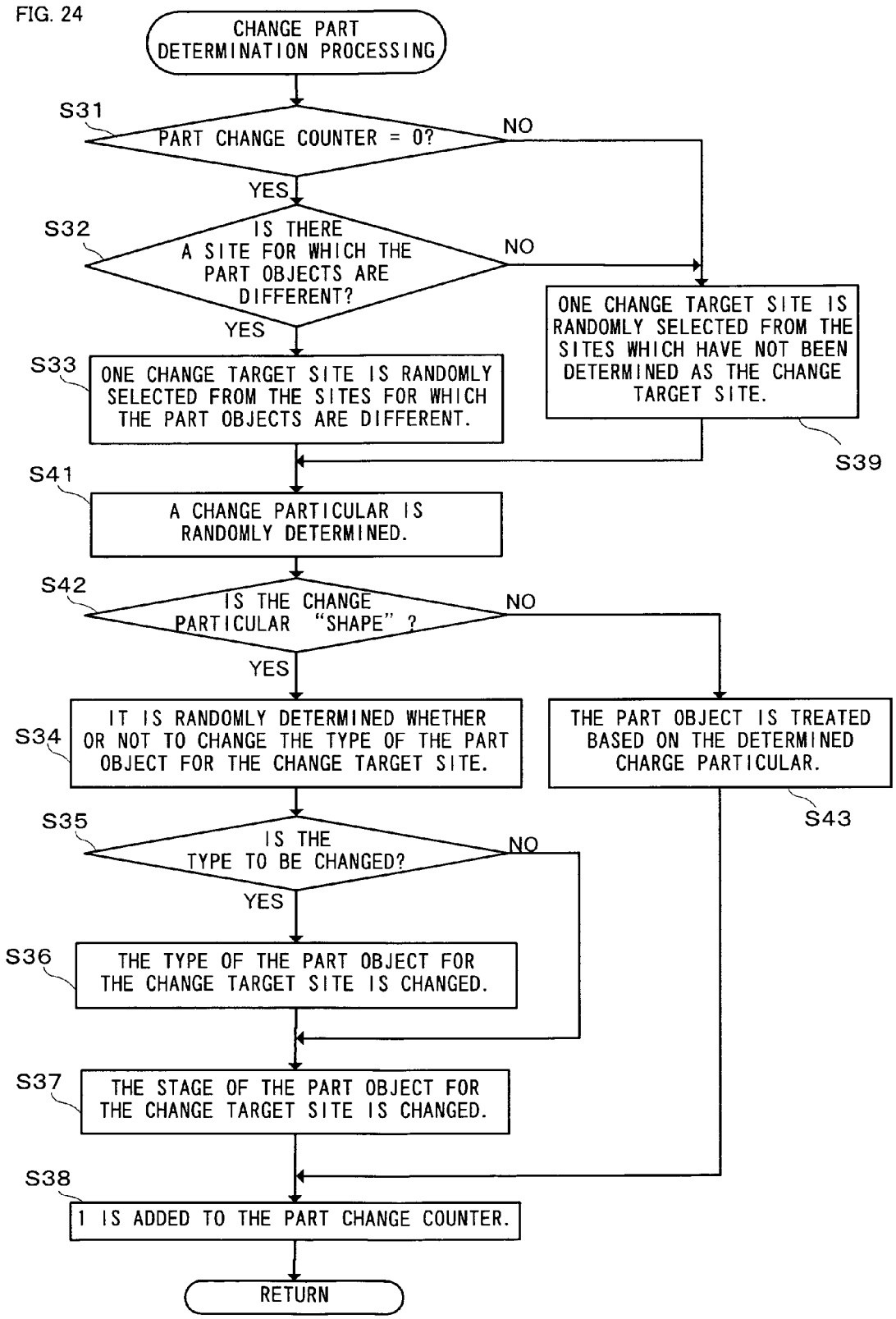
FIG. 24 is a flowchart illustrating change part determination processing in a second exemplary embodiment.

With reference to FIG. 23 and FIG. 24, a second exemplary embodiment will be described. In the first exemplary embodiment, a part object is replaced with another part object by changing the "type" or "stage". In the second exemplary embodiment, a part object is changed by executing a treatment on the part object itself in a predetermined manner in addition to by changing the type or stage. The particulars of the treatment executed on the part object include, for example, enlargement/reduction of the part object, up/down or right/left movement of the display position of the part object, rotation of the part object, and color change of the part object. A table defining whether each particular of the treatment is possible or impossible for each site is created in advance and stored in the main memory 33. Hereinafter, the table will be referred to as a "change particular table 339".

FIG. 23 shows an example of the change particular table 339. In FIG. 23, sites are arranged in the column direction, and change particulars are arranged in the row direction. A change of "shape" refers to replacing the part object with another part object by changing the type or stage as described in the first exemplary embodiment. FIG. 23 shows that, for example, for the site of "profile", the change of shape and the change of color are executable but the other change particulars are not executable. For the site of "eye", all the change particulars are executable. For the site of "nose", only the change of shape, the enlargement/reduction and the up/down movement are executable. In the second exemplary embodiment, the change part determination processing is executed using the change particular table 339.

Hereinafter, the object generation processing in the second exemplary embodiment will be described with reference to FIG. 19 used for the first exemplary embodiment and FIG. 24. The second exemplary embodiment is substantially the same as the first exemplary embodiment except for the processing in steps S4 and S5 in the flowchart of the main processing shown in FIG. 19 and the change part determination processing in FIG. 22. The processing which is the same as that of the first exemplary embodiment will not be described in detail.

In step S4 in FIG. 19, a difference between the reference object and the selected candidate object is detected. In the second exemplary embodiment, in this step, the CPU 30 further determines whether or not the reference object and the selected candidate object are different on points other than the shape. More specifically, even if the part number 3354 of a site is the same between the reference object and the selected candidate object, one of the part objects may be treated with enlargement/reduction or the like. In this case, it is determined that the site is different between the reference object and the selected candidate object. The information on this site and the change particular (information on whether it is the change of the "shape" or "enlargement/reduction", etc.) are stored in the different site data 337. In step S5, the information on the change particular such as the "enlargement/reduction" or "rotation" (for example, the enlargement/reduction magnification or rotation angle) is stored in the reference part data 338 as well as the part numbers 3354 or the like of the selected candidate object.

FIG. 24 is a flowchart illustrating the change part determination processing in the second exemplary embodiment. The flowchart in FIG. 24 is the same as that shown in FIG. 22 except for steps S41 through S43. The processing executed in steps other than steps S41 through S43 will not be described in detail.

Referring to FIG. 24, after the change target site is determined in step S33 or S39, the CPU 30 refers to the change particular table 339 to randomly determine a change particular to be executed (step S41). More specifically, the CPU 30 refers to the change particular table 339 to determine which change particular is possible for the change target site. The CPU 30 randomly determines a change particular to be executed from the possible change particulars. For example, when the change target site is "mouth", the CPU 30 randomly determines a change particular to be executed from "shape", "enlargement/reduction", "up/down movement", and "color".

The CPU determines whether or not the change particular determined in step S41 is a change of "shape" (step S42). When it is determined in step S42 that the change particular is the change of "shape" (YES in step S42), the CPU 30 advances the processing to step S37 and changes the "type" or "stage" as in the first exemplary embodiment. The processing after step S37 is the same as that in the first exemplary embodiment and will not be described again.

When it is determined in step 42 that the change particular is other than the change of "shape" (NO in step S42), the CPU 30 executes a treatment on the part object of the change target site of the reference object based on the change particular determined in step S41 (step S43). For example, when the change particular is "enlargement/reduction", the CPU 30 enlarges or reduces the part object at a predetermined magnification. When the change particular is "up/down movement", the CPU 30 moves the display position of the part object by a predetermined distance. When the change particular is "color", the CPU 30 changes the color of the part object to a predetermined color. Then, the CPU 30 advances the processing to step S38.

The change part determination processing in the second exemplary embodiment is executed in this manner. After this, a candidate object is generated in step S26 in the candidate object generation processing in FIG. 21.

As described above, in the second exemplary embodiment, a candidate object is generated not only by replacing the current part object with another part object but by executing a treatment on the current part object itself. Therefore, a candidate object which is more similar to the reference object can be generated, and the user can more easily select an object he/she wishes to generate. Since the object itself is treated, it is not necessary to prepare separate objects data. This reduces the memory capacity required for the object data.

In the second exemplary embodiment, the change particular determination is executed in two stages; i.e., after the change target site is determined (step S33 or S39), the change particular for the site is determined (step S41). The certain exemplary embodiments are not limited to this, and the processing in step S41 may be included in step S33 or S39, so that the determination processing is completed in one step. For example, in step S33 or S39, the change target site and the change particular are determined at the same time from, for example, "shape of the mouth", "enlargement/reduction of the mouth", "shape of the nose", and "the up/down movement of the nose".

While certain exemplary embodiments have been described in detail, the foregoing description is in all aspects illustrative and not restrictive. It is understood that numerous other modifications and variations can be devised without departing from the scope of the certain exemplary embodiments described herein.

What is claimed is:

1. A non-transitory storage medium having stored thereon a program executable by a computer of an apparatus for creating a character object by combining a plurality of part objects, each of which is for each of a plurality of parts which are used for forming a character object appearing in a virtual space, the program causing the computer to execute:
    generating a reference character object by combining part objects, each of which is selected for each part on the character object among the plurality of part objects stored for the respective parts;
    generating at least one candidate character object by changing at least one part object among the part objects used in the reference character object;
    displaying the reference character object and the candidate character object;
    accepting an input to select one of the reference character object and the candidate character object;
    determining a part on the character object for which different part objects are used between the selected character object and the reference character object by comparing the selected character object and the reference character object;
    generating at least one new character object by changing the part object used for the determined part on the character object with priority among the part objects used in the selected character object;
    updating the reference character object with the selected character object; and
    updating the candidate character object with the character object generated in the changed character generation step.

2. A storage medium according to claim 1, wherein the reference character object is generated based on a predetermined combination of the plurality of part objects.

3. A storage medium according to claim 2, wherein:
    the reference character object is generated based on a combination pattern predetermined in accordance with a parameter input by a user.

4. A storage medium according to claim 3, wherein the parameter is gender information of the user.

5. A storage medium according to claim 1, wherein the reference character object is generated by randomly combining the plurality of part objects.

6. A storage medium according to claim 1, wherein the reference character object and the candidate character object are each a face object of the character object.

7. A storage medium according to claim 1, wherein when generating the at least one new character object, the part object is changed by replacing the part object with a different part object.

8. A storage medium according to claim 1, wherein when generating the at least one new character object, the part object is changed by executing a predetermined treatment on the part object.

9. A storage medium according to claim 1, wherein when generating the candidate character object and the at least one new character object, the number of part objects to be changed has a predetermined upper limit.

10. A non-transitory storage medium having stored thereon a program executable by a computer of an apparatus for creating a character object by combining a plurality of part objects, each of which is for each of a plurality of parts which are used for forming a character object appearing in a virtual space, the program causing the computer to execute:
    generating a reference character object by reading a part object for each part on the character object from one of a plurality of groups, where a plurality of part objects for each part on the character object are divided into groups and the part objects of each group are stored in a memory and arranged as gradually and sequentially changing;
    generating at least one candidate character object by reading a part object which is stored close to at least one part object among the part objects used in the reference character object;

displaying the reference character object and the candidate character object;
accepting an input to select one of the reference character object and the candidate character object;
generating at least one new character object by reading a part object which is stored close to at least one part object among the part objects used in the selected character object;
updating the reference character object with the selected character object; and
updating the candidate character object with the new character object generated.

11. A storage medium according to claim 10, wherein in generating the candidate character object, the part object is read from storage positions within a predetermined range centered around the storage position of the at least one part object used in the reference character object.

12. A storage medium according to claim 10, wherein in generating the at least one new character object, the part object is read from storage positions within a predetermined range centered around the storage position of the at least one part object used in the selected character object.

13. A storage medium according to claim 10, wherein the part objects are stored as a one-dimensional string for each part on the character object.

14. A storage medium according to claim 13, wherein the part objects include a plurality of the one-dimensional string for each part on the character object.

15. A storage medium according to claim 14, wherein:
generating the candidate character object includes selecting a one-dimensional string, which is different from the one-dimensional string including the part object used in the reference character object, at a predetermined probability; and
the candidate character object is generated using the part object included in the selected one-dimensional string.

16. A storage medium according to claim 14, wherein:
generating the at least one new character object includes selecting a one-dimensional string, which is different from the one-dimensional string including the part object used in the selected character object, at a predetermined probability; and
the new character object is generated using the part object included in the selected one-dimensional string.

17. An apparatus for creating a character object by combining a plurality of part objects, each of which is for each of a plurality of parts which are used for forming a character object appearing in a virtual space, the apparatus comprising:
a reference character generation section for generating a reference character object by combining part objects, each of which is selected for each part on the character object among the plurality of part objects stored for the respective parts;
an initial candidate character generation section for generating at least one candidate character object by changing at least one part object among the part objects used in the reference character object;
a display output section for causing a display device to display the reference character object and the candidate character object;
a selection input acceptance section for accepting an input to select one of the reference character object and the candidate character object;
a change part determination section for determining a part on the character object for which different part objects are used between the selected character object and the reference character object by comparing the selected character object and the reference character object;
a changed character generation section for generating at least one new character object by changing the part object used for the part on the character object determined in the change part determination step with priority among the part objects used in the selected character object;
a reference character update section for updating the reference character object with the selected character object; and
a candidate character update section for updating the candidate character object with the character object generated by the changed character generation section.

18. An apparatus for creating a character object by combining a plurality of part objects, each of which is for each of a plurality of parts which are used for forming a character object appearing in a virtual space, wherein a plurality of part objects for each part on the character object are divided into groups, the apparatus comprising:
a memory for storing a plurality of part objects for each part on the character object, where the plurality of part objects are divided into groups and the part objects of each group are stored in an arrangement where the part objects are gradually and sequentially changing;
a reference character generation section for generating a reference character object by reading a part object from one of the groups for each part on the character object;
a candidate character generation section for generating at least one candidate character object by reading a part object which is stored close to at least one part object among the part objects used in the reference character object;
a display output section for causing a display device to display the reference character object and the candidate character object;
a selection input acceptance section for accepting an input to select one of the reference character object and the candidate character object;
a changed character generation section for generating at least one new character object by reading a part object which is stored close to at least one part object among the part objects used in the selected character object;
a reference character update section for updating the reference character object with the selected character object; and
a candidate character update section for updating the candidate character object with the character object generated by the changed character generation section.

19. A system for creating a character object by combining a plurality of part objects, each of which is for each of a plurality of parts which are used for forming a character object appearing in a virtual space, the apparatus comprising:
a reference character generation section for generating a reference character object by combining part objects, each of which is selected for each part on the character object among the plurality of part objects stored for the respective parts;
an initial candidate character generation section for generating at least one candidate character object by changing at least one part object among the part objects used in the reference character object;
a display output section for causing a display device to display the reference character object and the candidate character object;

a selection input acceptance section for accepting an input to select one of the reference character object and the candidate character object;

a change part determination section for determining a part on the character object for which different part objects are used between the selected character object and the reference character object by comparing the selected character object and the reference character object;

a changed character generation section for generating at least one new character object by changing the part object used for the part on the character object determined in the change part determination step with priority among the part objects used in the selected character object;

a reference character update section for updating the reference character object with the selected character object; and a candidate character update section for updating the candidate character object with the character object generated by the changed character generation section.

20. A system for creating a character object by combining a plurality of part objects, each of which is for each of a plurality of parts which are used for forming a character object appearing in a virtual space, wherein a plurality of part objects for each part on the character object are divided into groups, the apparatus comprising:

a memory for storing a plurality of part objects for each part on the character object, where the plurality of part objects are divided into groups and the part objects of each group are stored in an arrangement where the part objects are gradually and sequentially changing;

a reference character generation section for generating a reference character object by reading a part object from one of the groups for each part on the character object;

a candidate character generation section for generating at least one candidate character object by reading a part object which is stored close to at least one part object among the part objects used in the reference character object;

a display output section for causing a display device to display the reference character object and the candidate character object;

a selection input acceptance section for accepting an input to select one of the reference character object and the candidate character object;

a changed character generation section for generating at least one new character object by reading a part object which is stored close to at least one part object among the part objects used in the selected character object;

a reference character update section for updating the reference character object with the selected character object; and a candidate character update section for updating the candidate character object with the character object generated by the changed character generation section.

21. A method for creating a character object by combining a plurality of part objects, each of which is for each of a plurality of parts which are used for forming a character object appearing in a virtual space, the method comprising:

generating a reference character object by combining part objects, each of which is selected for each part on the character object among the plurality of part objects stored for the respective parts;

generating at least one candidate character object by changing at least one part object among the part objects used in the reference character object;

displaying the reference character object and the candidate character object;

accepting an input to select one of the reference character object and the candidate character object;

determining a part on the character object for which different part objects are used between the selected character object and the reference character object by comparing the selected character object and the reference character object;

generating at least one new character object by changing the part object used for the determined part on the character object with priority among the part objects used in the selected character object;

updating the reference character object with the selected character object; and updating the candidate character object with the generated character object.

22. A method for forming a character object by combining a plurality of part objects, each comprising a plurality of parts which are used for forming the character object appearing in a virtual space, wherein a plurality of part objects for each part of the character object are divided into groups, the method comprising:

storing a plurality of part objects for each part on the character object, where the plurality of part objects are divided into groups and the part objects of each group are stored in an arrangement providing part objects that are gradually and sequentially changing;

generating a reference character object by reading a part object from one of the groups for each part of the character object;

generating at least one candidate character object by reading a part object which is stored near at least one part object among the part objects used in the reference character object;

displaying on a display device the reference character object and the candidate character object;

accepting an input to select one of the reference character object and the candidate character object;

generating at least one new character object by reading a part object which is stored near at least one part object among the part objects used in the selected character object;

updating the reference character object with the selected character object; and updating the candidate character object with the generated character object.

* * * * *